United States Patent
Yoshida

(10) Patent No.: US 11,507,260 B2
(45) Date of Patent: Nov. 22, 2022

(54) ELECTRONIC ALBUM APPARATUS, METHOD FOR OPERATING ELECTRONIC ALBUM APPARATUS, AND OPERATION PROGRAM UTILIZING DISPLAY CELL ENLARGEMENT

(71) Applicant: FUJIFILM Corporation, Tokyo (JP)

(72) Inventor: Masako Yoshida, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 69 days.

(21) Appl. No.: 16/906,726

(22) Filed: Jun. 19, 2020

(65) Prior Publication Data
US 2020/0319781 A1     Oct. 8, 2020

Related U.S. Application Data

(63) Continuation of application No. PCT/JP2018/043520, filed on Nov. 27, 2018.

(30) Foreign Application Priority Data

Jan. 30, 2018    (JP) .............................. JP2018-013893

(51) Int. Cl.
*G06F 3/00* (2006.01)
*G06F 3/04845* (2022.01)
(Continued)

(52) U.S. Cl.
CPC ........ *G06F 3/04845* (2013.01); *G06F 3/0482* (2013.01); *G06F 3/04883* (2013.01); *G06T 11/60* (2013.01)

(58) Field of Classification Search
CPC ............... G06F 3/04845; G06F 3/0482; G06F 3/04883; G06T 11/60
See application file for complete search history.

(56) References Cited

U.S. PATENT DOCUMENTS 8,756,528 B2 * 6/2014 Cristofoli ........... H04N 21/4316
                                                                        715/838
9,148,613 B1 * 9/2015 Goldberg ........... H04N 21/4316
(Continued)

FOREIGN PATENT DOCUMENTS

| JP | H10-243353 A | 9/1998 |
| JP | 2013-512508 A | 4/2013 |

(Continued)

OTHER PUBLICATIONS

An Office Action; "Decision of Refusal," mailed by the Japanese Patent Office dated Aug. 17, 2021, which corresponds to Japanese Patent Application No. 2019-568884 and is related to U.S. Appl. No. 16/906,726 with English language translation.

(Continued)

*Primary Examiner* — Roberto Borja
*Assistant Examiner* — Andrew Chung
(74) *Attorney, Agent, or Firm* — Studebaker & Brackett PC

(57) ABSTRACT

A plurality of display cells (CL) are arranged in a grid form on an album screen (14). In each display cell (CL), an image (P) in one frame is arranged, and the size of the display cell (CL) is changed to be an integer multiple of a reference size in units of the reference size. A cell enlargement instruction for enlarging the display cell (CL) is accepted through a gesture of tracking the album screen (14) with a finger. In accordance with a track (TR) of the finger (F), an enlargement area is determined. The display cell (CL) that is an enlargement target and the image (P) are enlarged in accordance with the determined enlargement area.

15 Claims, 33 Drawing Sheets

(51) Int. Cl.
  *G06F 3/0482*    (2013.01)
  *G06F 3/04883*   (2022.01)
  *G06T 11/60*     (2006.01)

(56) References Cited

U.S. PATENT DOCUMENTS

| | | | | |
|---|---|---|---|---|
| 10,477,277 | B2* | 11/2019 | Cormican | H04N 21/4722 |
| 2005/0091599 | A1* | 4/2005 | Yamakado | G06F 3/0481 |
| | | | | 715/732 |
| 2010/0080490 | A1* | 4/2010 | Akiyama | G06T 11/60 |
| | | | | 382/294 |
| 2011/0126148 | A1 | 5/2011 | Krishnaraj et al. | |
| 2012/0092712 | A1* | 4/2012 | Matsumoto | G06F 40/106 |
| | | | | 358/1.15 |
| 2012/0185761 | A1* | 7/2012 | Adepalli | G06F 3/04883 |
| | | | | 715/227 |
| 2012/0198381 | A1* | 8/2012 | Kumamoto | G06F 40/106 |
| | | | | 715/781 |
| 2012/0300259 | A1 | 11/2012 | Hosaka et al. | |
| 2013/0061122 | A1* | 3/2013 | Sethi | G06F 40/18 |
| | | | | 715/219 |
| 2013/0239049 | A1* | 9/2013 | Perrodin | G06F 3/0481 |
| | | | | 715/800 |
| 2014/0071160 | A1 | 3/2014 | Sugiura et al. | |
| 2014/0096082 | A1* | 4/2014 | Zhen | G06F 3/04817 |
| | | | | 715/830 |
| 2014/0218611 | A1* | 8/2014 | Park | H04N 5/45 |
| | | | | 348/565 |
| 2015/0002527 | A1* | 1/2015 | Chedeau | G06T 11/60 |
| | | | | 345/581 |
| 2015/0082211 | A1 | 3/2015 | Lee | |
| 2016/0026376 | A1* | 1/2016 | Schultink | G06F 40/10 |
| | | | | 715/731 |
| 2016/0093071 | A1* | 3/2016 | Miki | G06T 11/60 |
| | | | | 345/589 |
| 2017/0010807 | A1 | 1/2017 | Jung et al. | |
| 2017/0262247 | A1* | 9/2017 | Yoganandan | H04N 19/70 |
| 2018/0150433 | A1* | 5/2018 | Sowden | H04N 1/00185 |
| 2018/0349024 | A1* | 12/2018 | Yoshino | G06F 3/04886 |

FOREIGN PATENT DOCUMENTS

| | | |
|---|---|---|
| JP | 2014-052915 A | 3/2014 |
| JP | 2014-142791 A | 8/2014 |
| JP | 2017-117479 A | 6/2017 |
| JP | 2017-223766 A | 12/2017 |
| WO | 2011/093367 A1 | 8/2011 |

OTHER PUBLICATIONS

An Office Action; "Notice of Reasons for Refusal", mailed by the Japanese Patent Office dated Feb. 24, 2021, which corresponds to Japanese Patent Application No. 2019-568884 and is related to U.S. Appl. No. 16/906,726; with English language translation.

International Search Report issued in PCT/JP2018/043520; dated Feb. 12, 2019.

International Preliminary Report On Patentability and Written Opinion issued in PCT/JP2018/043520; dated Aug. 4, 2020.

\* cited by examiner

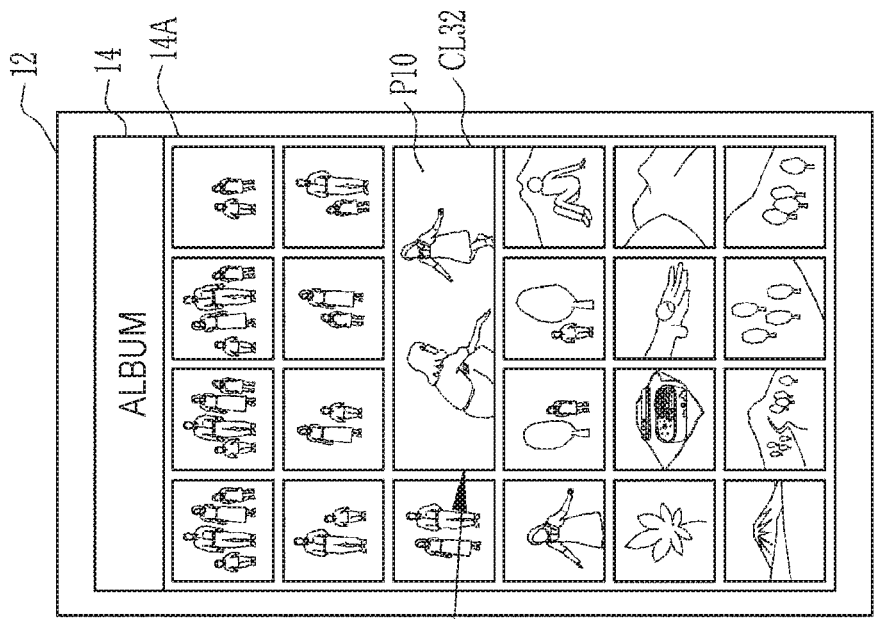
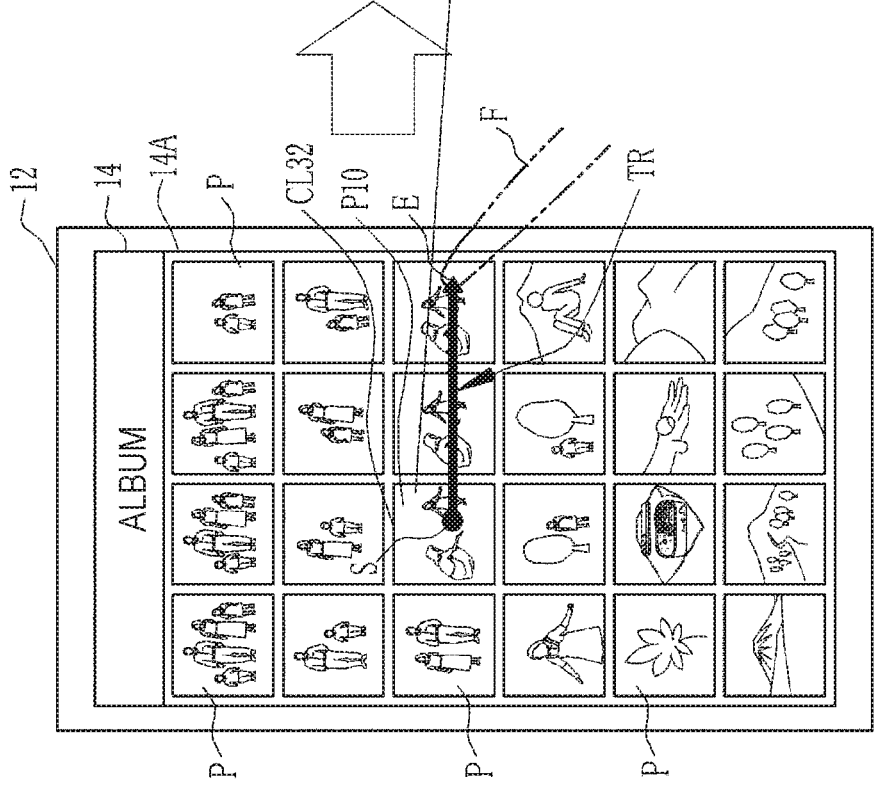

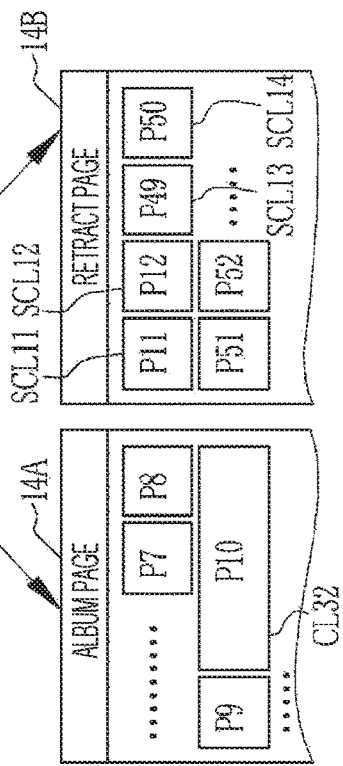
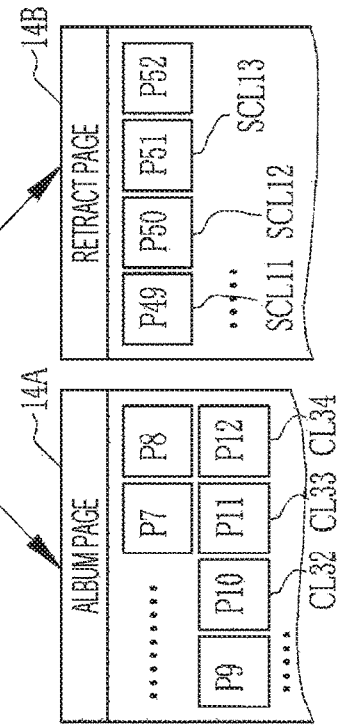
FIG. 9A
FIG. 9B

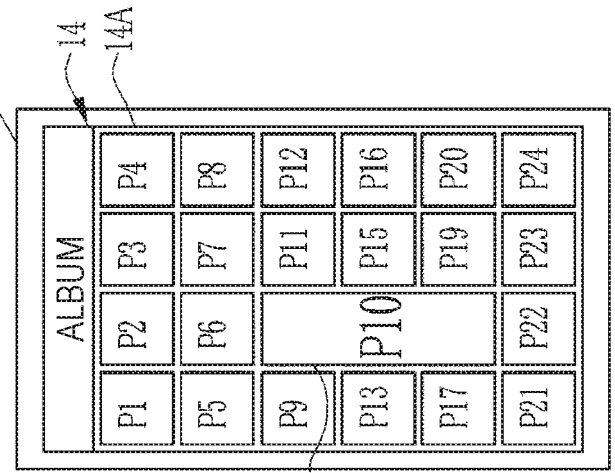
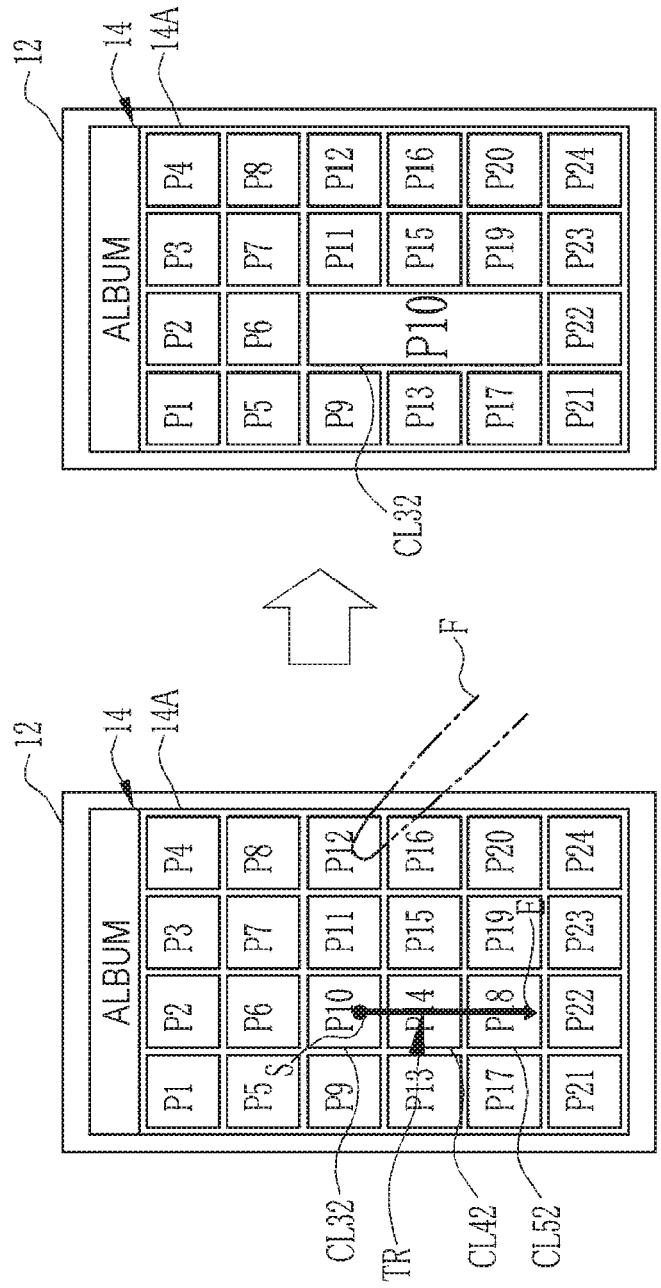

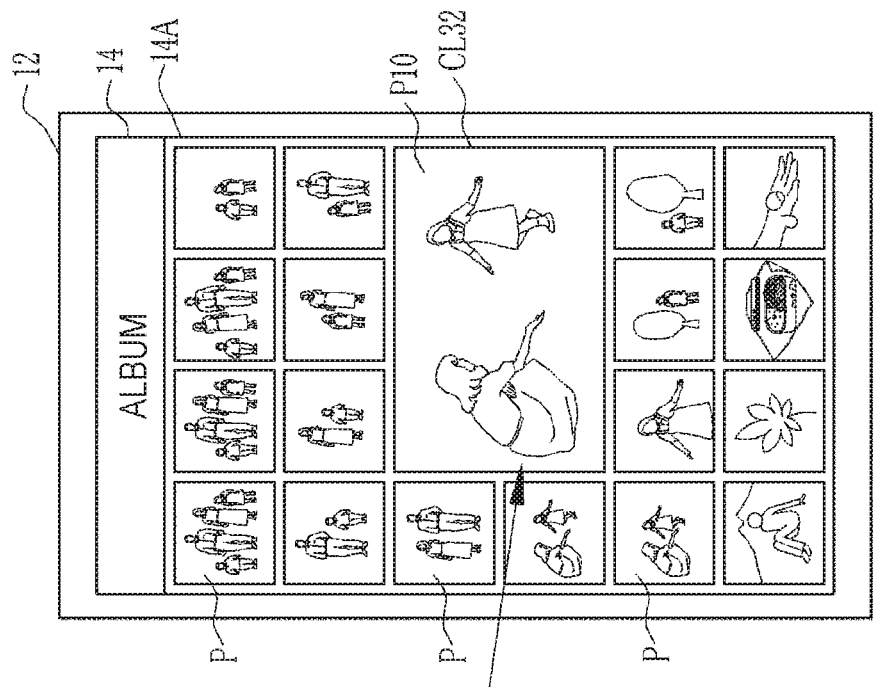
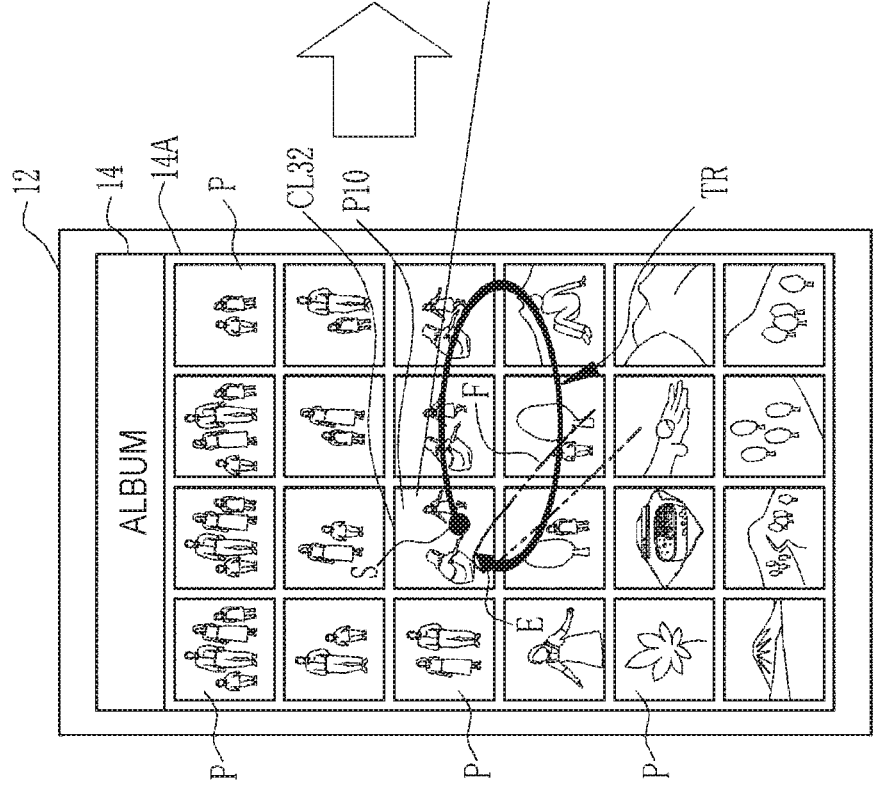

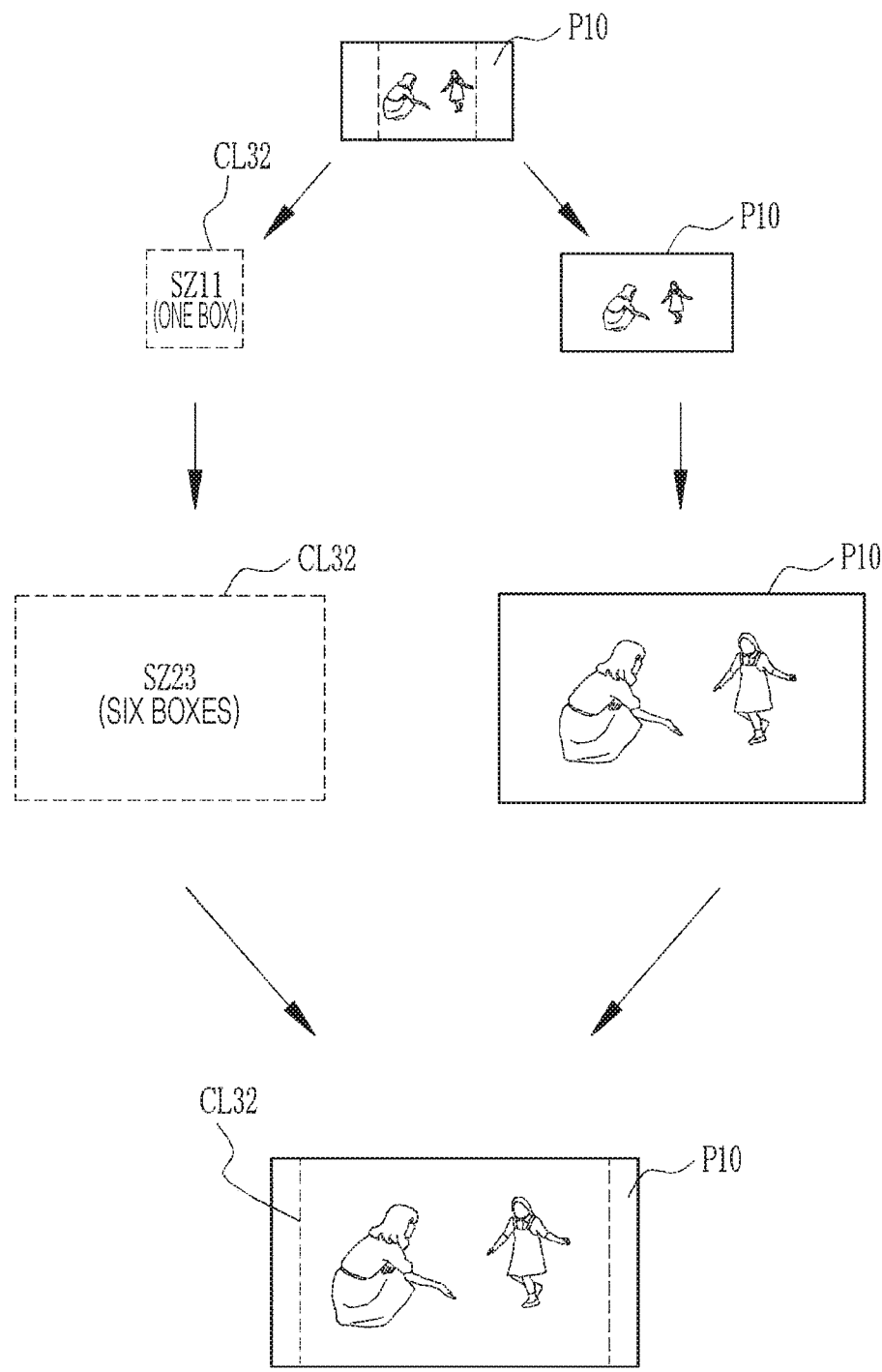

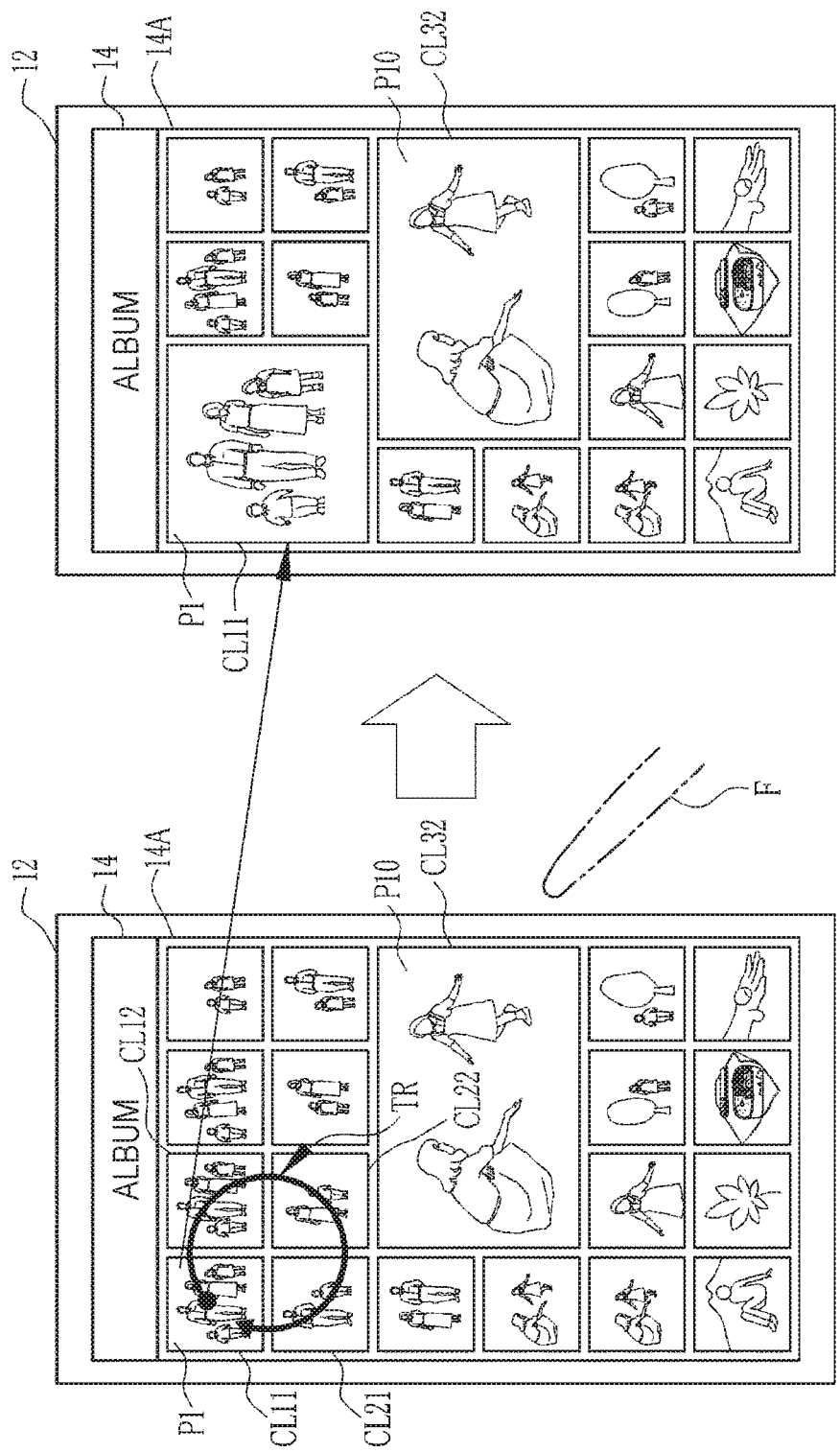

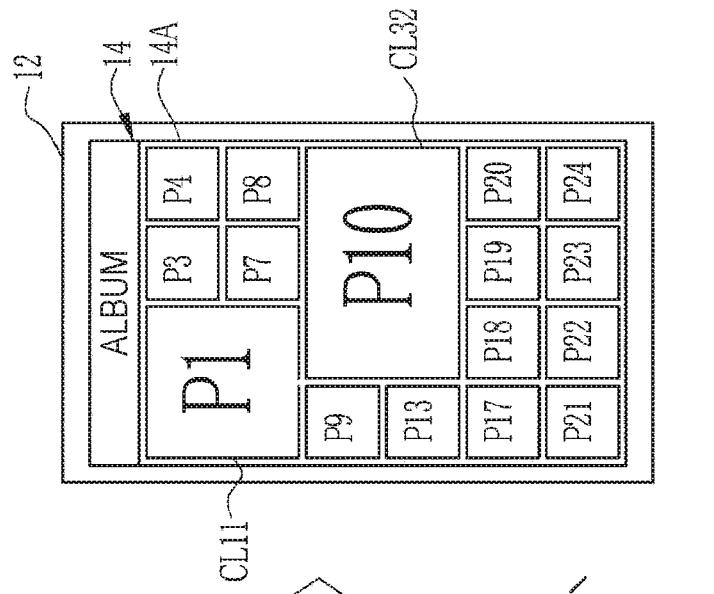
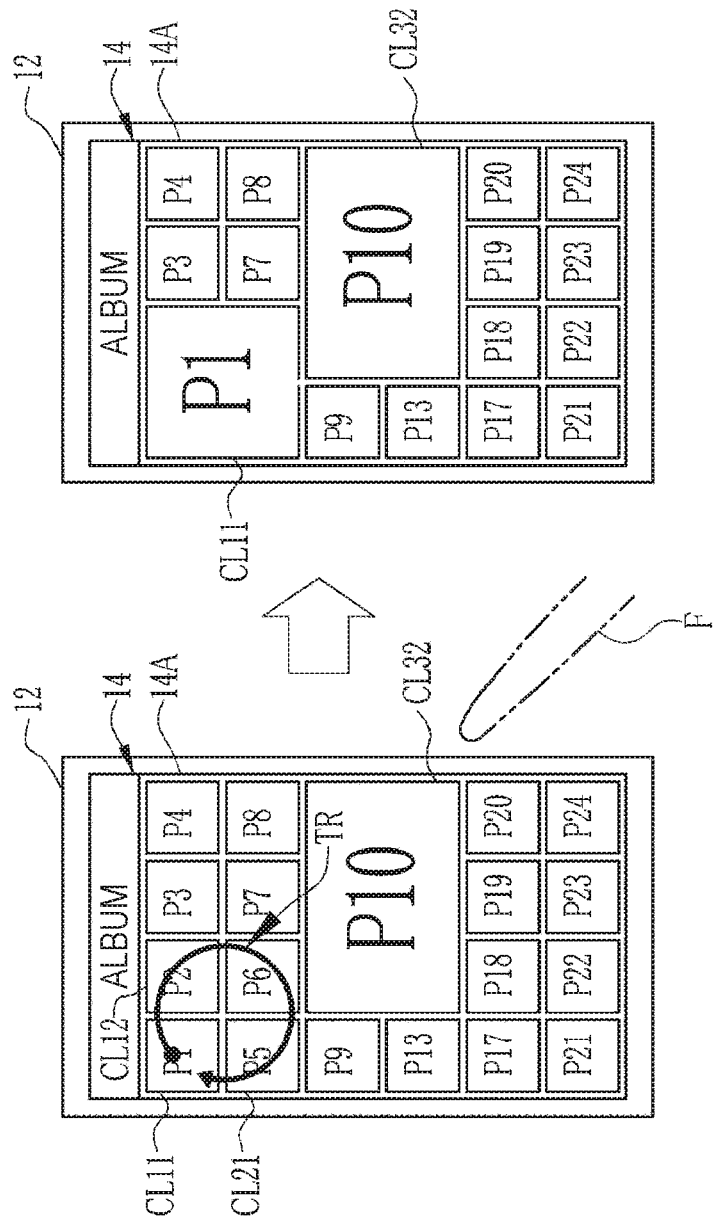

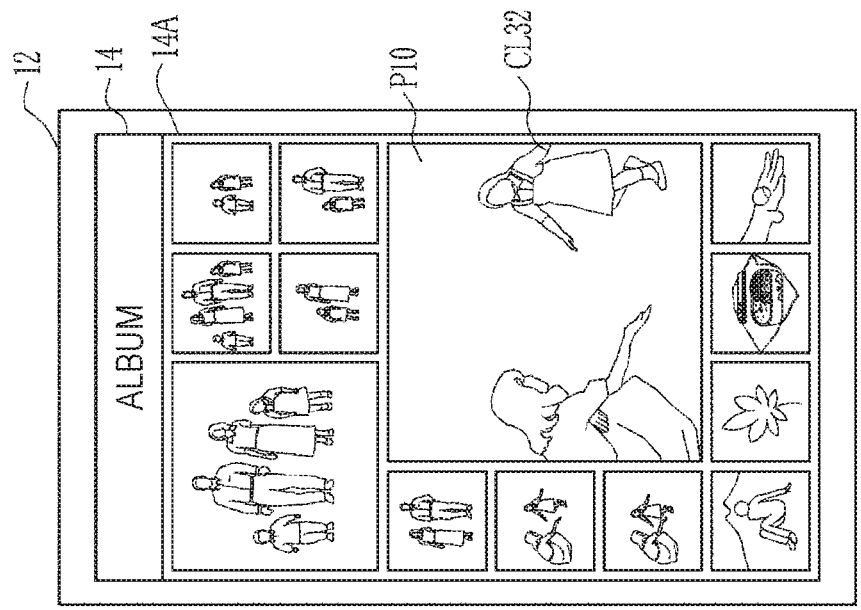
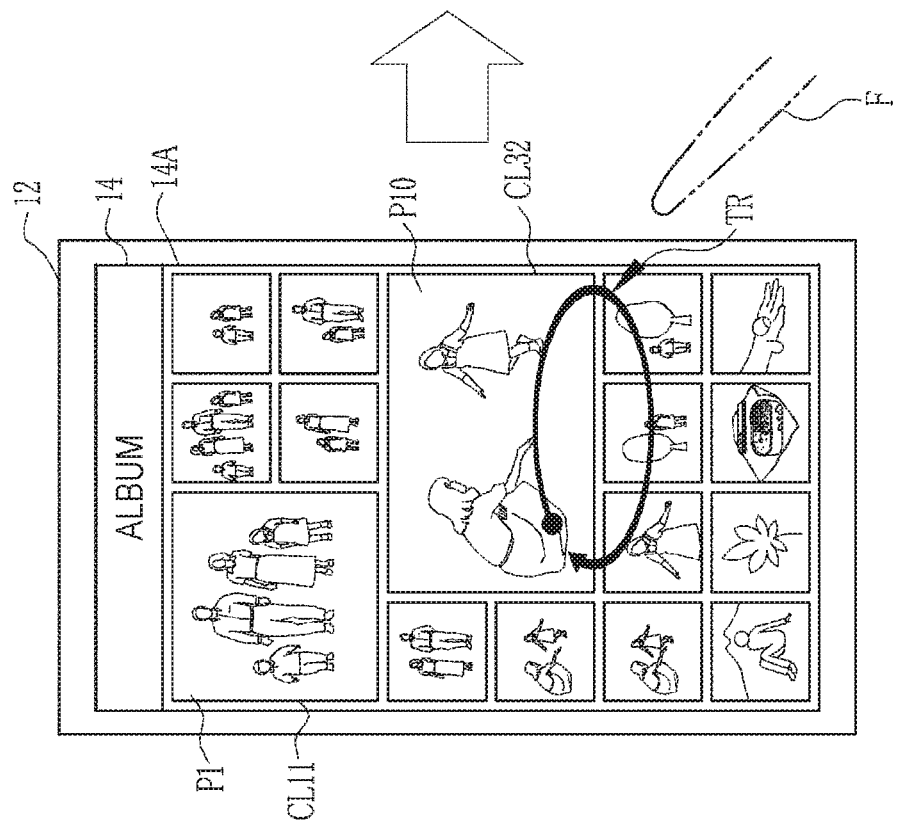
FIG. 22B
FIG. 22A

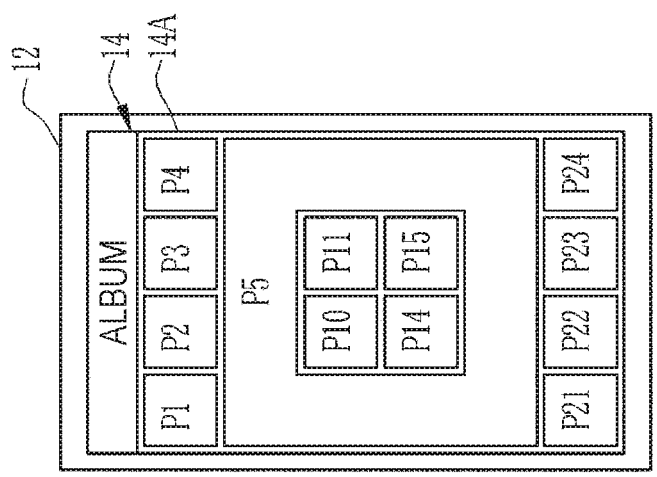
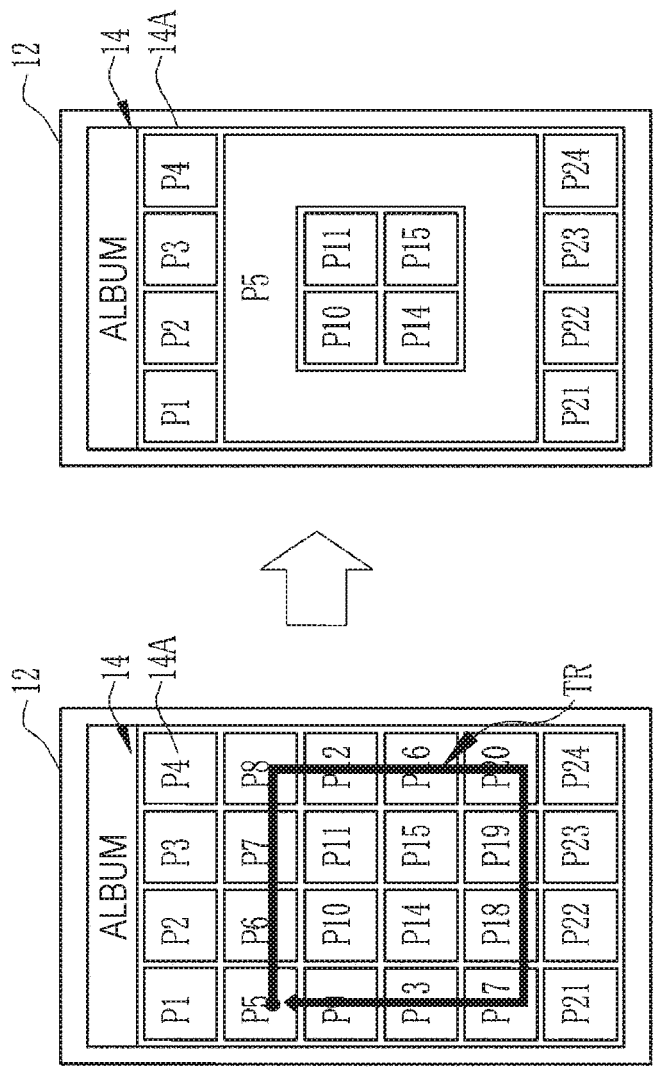

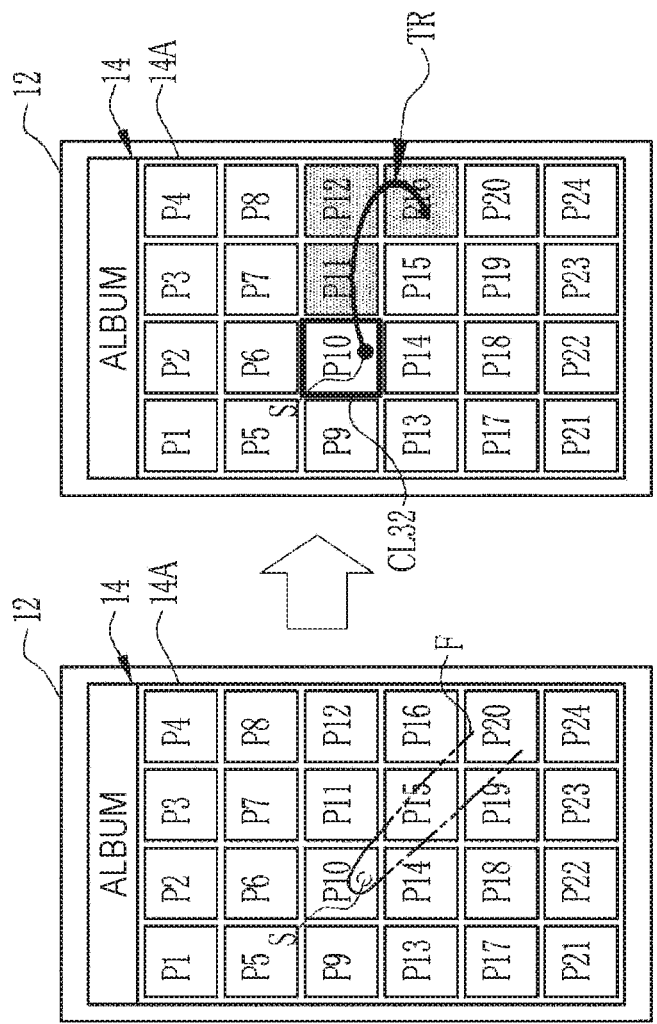

FIG. 27A FIG. 27B FIG. 27C

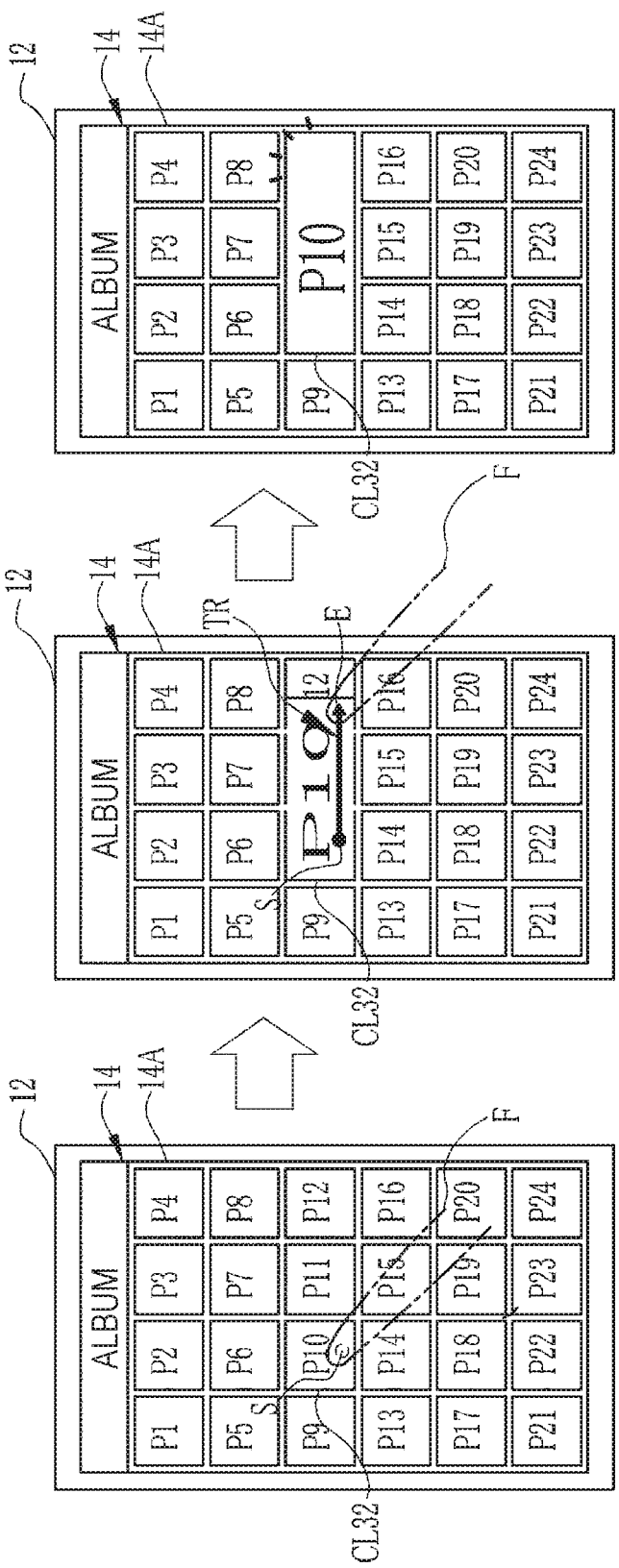

FIG. 30A  FIG. 30B  FIG. 30C

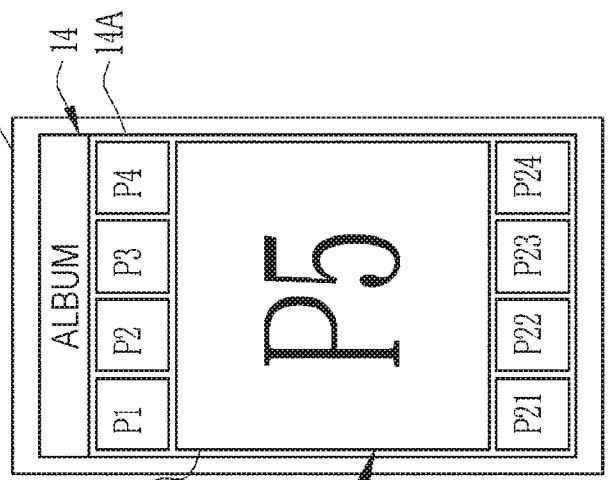
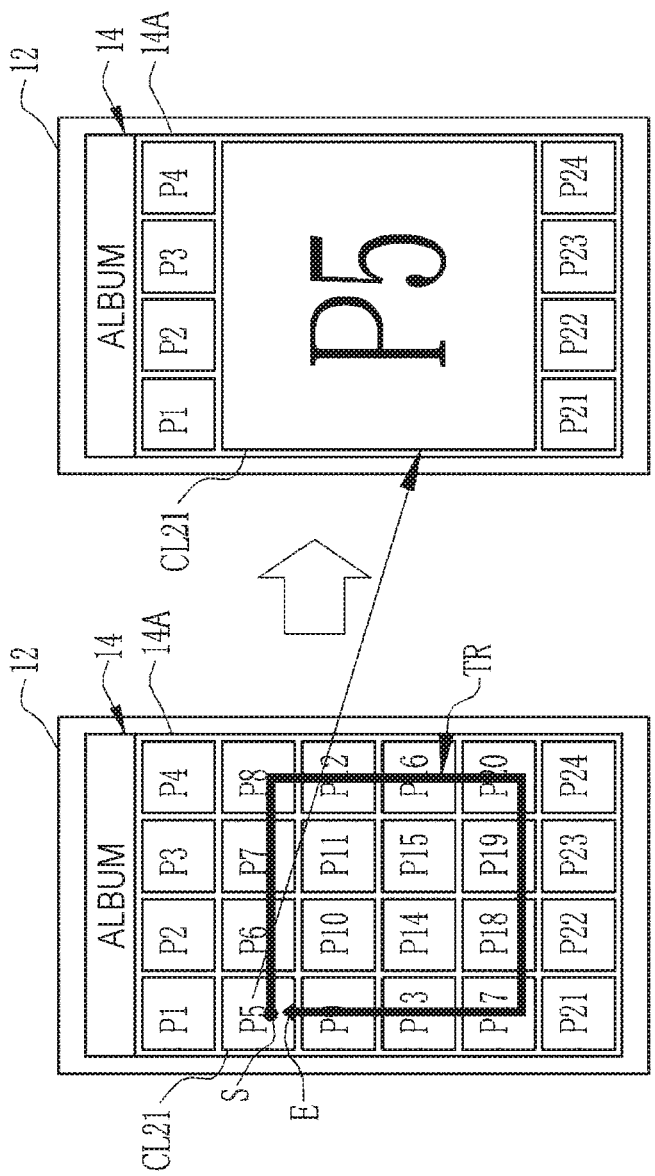

ELECTRONIC ALBUM APPARATUS, METHOD FOR OPERATING ELECTRONIC ALBUM APPARATUS, AND OPERATION PROGRAM UTILIZING DISPLAY CELL ENLARGEMENT

CROSS-REFERENCE TO RELATED APPLICATIONS

This application is a Continuation of PCT International Application No. PCT/JP2018/043520 filed on Nov. 27, 2018, which claims priority under 35 U.S.C § 119(a) to Japanese Patent Application No. 2018-013893 filed on Jan. 30, 2018. Each of the above application(s) is hereby expressly incorporated by reference, in its entirety, into the present application.

BACKGROUND OF THE INVENTION

1. Field of the Invention

The present invention relates to an electronic album apparatus, a method for operating an electronic album apparatus, and a non-transitory computer readable recording medium storing an operation program.

2. Description of the Related Art

An electronic album apparatus that displays an electronic album screen on which images such as photographs are arranged in a grid form has been known (for example, see JP2017-117479A). An electronic album apparatus according to JP2017-117479A displays, on a display of a smartphone or the like, an electronic album screen on which a plurality of images of the same size are arranged in a grid form.

In the electronic album apparatus according to JP2017-117479A, an image in an arbitrary frame within an electronic album screen can be enlarged. An enlargement instruction can be accepted through a finger gesture performed on the electronic album screen. Specifically, within the electronic album screen, an image in an arbitrary frame, which is an enlargement target, is designated, and pinch-out, which is a gesture for moving two fingers apart, is performed within the designated image. In response to pinch-out, the pinch-out is recognized as an enlargement instruction, and the designated image is enlarged. An enlargement size of the image can be designated to an arbitrary size and is determined in accordance with the width between two fingers moving for pinch-put (interval between two fingers) (see paragraphs 0263 to 0265 and FIG. 21 in JP2017-117479A).

SUMMARY OF THE INVENTION

However, on an electronic album screen on which a plurality of images are arranged in a grid form, if an enlargement size of an image is arbitrary as in JP2017-117479A, it has been difficult to arrange the plurality of images in a good-looking manner. As long as the plurality of images are arranged in a grid form, misalignment of vertical and horizontal block lines that define boxes of the grid degrades the look of the entire album. If the enlargement size is arbitrary, the block lines are likely to be misaligned, and it is difficult to designate the enlargement size of the image as an enlargement target so as to align with block lines of an adjacent image. In particular, in a case of a gesture using a finger, if the size of an image in a frame is small compared with the thickness of the finger, it is difficult to finely adjust the enlargement size, and it is more difficult to designate the enlargement size.

An object of the present invention is to provide an electronic album apparatus, a method for operating an electronic album apparatus, and a non-transitory computer readable recording medium storing an operation program that can arrange a plurality of images in a good-looking manner with ease even when an enlargement instruction for enlarging an image in one frame is accepted through a finger gesture on an electronic album screen on which the plurality of images are arranged in a grid form.

In order to achieve the above object, an electronic album apparatus according to the present invention includes an album screen generating unit, an operation accepting unit, an enlargement target determining unit, a cell enlargement area determining unit, and an enlargement processing unit. The album screen generating unit generates an electronic album screen on which a plurality of image display cells are arranged in a grid form to display a plurality of images, the plurality of image display cells each being an image display cell in which an image in one frame is arranged and a size of which is changed to be N times as large as a reference size in units of the reference size. The operation accepting unit accepts a touch operation including a gesture of tracking the electronic album screen with a finger. The enlargement target determining unit determines one of the image display cells as an enlargement target on the basis of the touch operation. The cell enlargement area determining unit determines a number of boxes in units of the reference size as the size of the image display cell, which is determined as the enlargement target, after enlargement in accordance with a track of the finger in the gesture within the electronic album screen, and determines a shape of an enlargement area after enlargement. The enlargement processing unit enlarges the image display cell that is the enlargement target and the image in accordance with the determined enlargement area. Herein, N is a natural number of greater than or equal to 1.

The gesture is preferably a swipe gesture of tracking the electronic album screen with one finger from, as a start point, the image display cell that is the enlargement target on the electronic album screen.

The cell enlargement area determining unit preferably determines that an area including a plurality of image display cells among the plurality of image display cells overlapping with a track of the finger in the swipe gesture is the enlargement area.

The enlargement area overlapping with the track of the finger is preferably displayed in a form distinguishable from other areas that do not overlap with the track of the finger while the swipe gesture is being performed.

The cell enlargement area determining unit preferably accepts, after accepting designation of the enlargement target, an operation for extending one end of the enlargement target with one finger as the swipe gesture and determines the enlargement area on the basis of the start point and an end point of the track of the finger in the swipe gesture.

The image in the enlargement target is preferably displayed in a state of being extended along the track of the finger while the swipe gesture is being performed.

The image display cell that is the enlargement target, which is the start point of the track of the finger in the swipe gesture, is preferably displayed in a form distinguishable from the other image display cells while the swipe gesture is being performed.

The electronic album screen preferably includes an album page and a retract image accommodating page, the album page being a page on which an image selected by a user as an image to be displayed from among the plurality of images is arranged, the retract image accommodating page being a page in which an image retracted from the album page is accommodated, and, on the album page after the image display cell has been enlarged, images in image display cells that have been present before enlargement within the enlargement area occupied by the image display cell after enlargement are preferably retracted to the retract image accommodating page.

After the image display cell has been enlarged, images in image display cells that have been present before enlargement within the enlargement area occupied by the image display cell after enlargement are preferably rearranged in image display cells that do not overlap with the enlargement area.

In the size of the image display cell, the size that is N times as large as the reference size preferably includes, in units of the reference size for rows or columns, at least one of one row×a plurality of columns, a plurality of rows×one column, or a plurality of rows×a plurality of columns.

If an aspect ratio of the image and an aspect ratio of the image display cell differ from each other, it is preferable that part of the image be partly displayed in accordance with the aspect ratio of the image display cell.

The display part of the image partly displayed in the image display cell is preferably changeable.

The electronic album screen is preferably displayed on a touch panel display of a mobile information terminal.

A method for operating an electronic album apparatus according to the present invention includes an album screen generating step, an operation accepting step, an enlargement target determining step, a cell enlargement area determining step, and an enlargement process step. In the album screen generating step, an electronic album screen on which a plurality of image display cells are arranged in a grid form to display a plurality of images is generated, the plurality of image display cells each being an image display cell in which an image in one frame is arranged and a size of which is changed to be N times as large as a reference size in units of the reference size. In the operation accepting step, a touch operation including a gesture of tracking the electronic album screen with a finger is accepted. In the enlargement target determining step, one of the image display cells is determined as an enlargement target on the basis of the touch operation. In the cell enlargement area determining step, a number of boxes in units of the reference size is determined as the size of the image display cell, which is determined as the enlargement target, after enlargement in accordance with a track of the finger in the gesture within the electronic album screen, and a shape of an enlargement area after enlargement is determined. In the enlargement process step, the image display cell that is the enlargement target and the image are enlarged in accordance with the determined enlargement area. Herein, N is a natural number of greater than or equal to 1.

A non-transitory computer readable recording medium storing an electronic album operation program according to the present invention is a non-transitory computer readable recording medium storing an electronic album operation program for causing a computer to function as an electronic album apparatus and includes an album screen generating step, an operation accepting step, an enlargement target determining step, a cell enlargement area determining step, and an enlargement process step. In the album screen generating step, an electronic album screen on which a plurality of image display cells are arranged in a grid form to display a plurality of images is generated, the plurality of image display cells each being an image display cell in which an image in one frame is arranged and a size of which is changed to be N times as large as a reference size in units of the reference size. In the operation accepting step, a touch operation including a gesture of tracking the electronic album screen with a finger is accepted. In the enlargement target determining step, one of the image display cells is determined as an enlargement target on the basis of the touch operation. In the cell enlargement area determining step, a number of boxes in units of the reference size is determined as the size of the image display cell, which is determined as the enlargement target, after enlargement in accordance with a track of the finger in the gesture within the electronic album screen, and a shape of an enlargement area after enlargement is determined. In the enlargement process step, the image display cell that is the enlargement target and the image are enlarged in accordance with the determined enlargement area. Herein, N is a natural number of greater than or equal to 1.

According to the present invention, a plurality of images can be arranged in a good-looking manner with ease even when an enlargement instruction of an image in one frame is accepted through a finger gesture on an electronic album screen on which the plurality of images are arranged in a grid form.

BRIEF DESCRIPTION OF THE DRAWINGS

FIG. 5A is an explanatory diagram of an edit menu for issuing an instruction for selecting/retracting an image on the album screen, and FIG. 5B is an explanatory diagram illustrating a state where the album screen is split into two parts, the album page and a retract page;

FIG. 6A is an explanatory diagram of an operation for selecting and registering an image on the album page, and FIG. 6B is an explanatory diagram of an operation for retracting an image from the album page;

FIGS. 7A and 7B are explanatory diagrams of a process for enlarging a display cell of a reference size to a size of one row and three columns, FIG. 7A illustrates a state before enlargement, and FIG. 7B illustrates a state after enlargement;

FIG. 8A illustrates an operation for designating an enlargement target, FIG. 8B illustrates an operation for designating an enlargement area, and FIG. 8C illustrates a state after enlargement;

FIGS. 9A and 9B are explanatory diagrams illustrating changes in album management information if the operations in FIGS. 8A to 8C are performed, FIG. 9A illustrates the album management information before enlargement, and FIG. 9B illustrates the album management information after enlargement;

FIG. 12A illustrates a state before enlargement, and FIG. 12B illustrates a state after enlargement;

FIGS. 13A and 13B are schematic diagrams illustrating an operation in the process in FIGS. 12A and 12B, FIG. 13A illustrates an operation for designating an enlargement area, and FIG. 13B illustrates a state after enlargement;

FIGS. 15A and 15B are explanatory diagrams of a process for enlarging a display cell of a reference size to a size of two rows and three columns, FIG. 15A illustrates a state before enlargement, and FIG. 15B illustrates a state after enlargement;

FIG. 16A illustrates an operation for designating an enlargement area, and FIG. 16B illustrates a state after enlargement;

FIG. 17 is an explanatory diagram of a trimming process in a case of FIGS. 15A and 15B;

FIGS. 20A and 20B are explanatory diagrams of an example for enlarging a plurality of images P, FIG. 20A illustrates a state before enlargement, and FIG. 20B illustrates a state after enlargement;

FIGS. 21A and 21B are schematic diagrams illustrating an operation in the process in FIGS. 20A and 20B, FIG. 21A illustrates an operation for designating an enlargement area, and FIG. 21B illustrates a state after enlargement;

FIGS. 22A and 22B are explanatory diagrams of a process for enlarging an image again, FIG. 22A illustrates an operation for designating an enlargement area, and FIG. 22B illustrates a state after enlargement;

FIG. 23A illustrates an operation for designating an enlargement area, and FIG. 23B illustrates a state after enlargement;

FIGS. 24A and 24B are explanatory diagrams according to a modification example of an operation for designating an enlargement area, FIG. 24A illustrates an operation for designating an enlargement area, and FIG. 24B illustrates a state after enlargement;

FIG. 25A illustrates an operation for designating an enlargement area, and FIG. 25B illustrates a state after enlargement;

FIGS. 26A and 26B are explanatory diagrams of an example for displaying an enlargement target in a distinguishable manner, FIG. 26A illustrates an operation for designating an enlargement area, and FIG. 26B illustrates a state after enlargement;

FIGS. 27A to 27C are explanatory diagrams according to a modification example for displaying an enlargement target in a distinguishable manner, FIGS. 27A, 27B, and 27C respectively illustrate distinguishable display examples by using blinking, vibration, and expansion and contraction;

FIG. 28A is an explanatory diagram illustrating an example of decreasing transparency of display cells, and FIG. 28B is an explanatory diagram illustrating an example of displaying a track;

FIGS. 29A to 29C are explanatory diagrams illustrating a method for designating an enlargement area of one row and three columns in a second embodiment, FIG. 29A illustrates a method for designating an enlargement target, FIG. 29B illustrates an operation for designating an enlargement area, and FIG. 29C illustrates a state after enlargement;

FIGS. 30A to 30C are explanatory diagrams illustrating a method for designating an enlargement area of two rows and three columns in the second embodiment, FIG. 30A illustrates a method for designating an enlargement target, FIG. 30B illustrates an operation for designating an enlargement area, and FIG. 30C illustrates a state after enlargement;

FIGS. 31A and 31B are explanatory diagrams illustrating a modification example of a method for designating an enlargement area in the second embodiment, FIG. 31A illustrates an operation for designating an enlargement area, and FIG. 31B illustrates a state after enlargement;

DESCRIPTION OF THE PREFERRED EMBODIMENTS

First Embodiment

Figure 1:
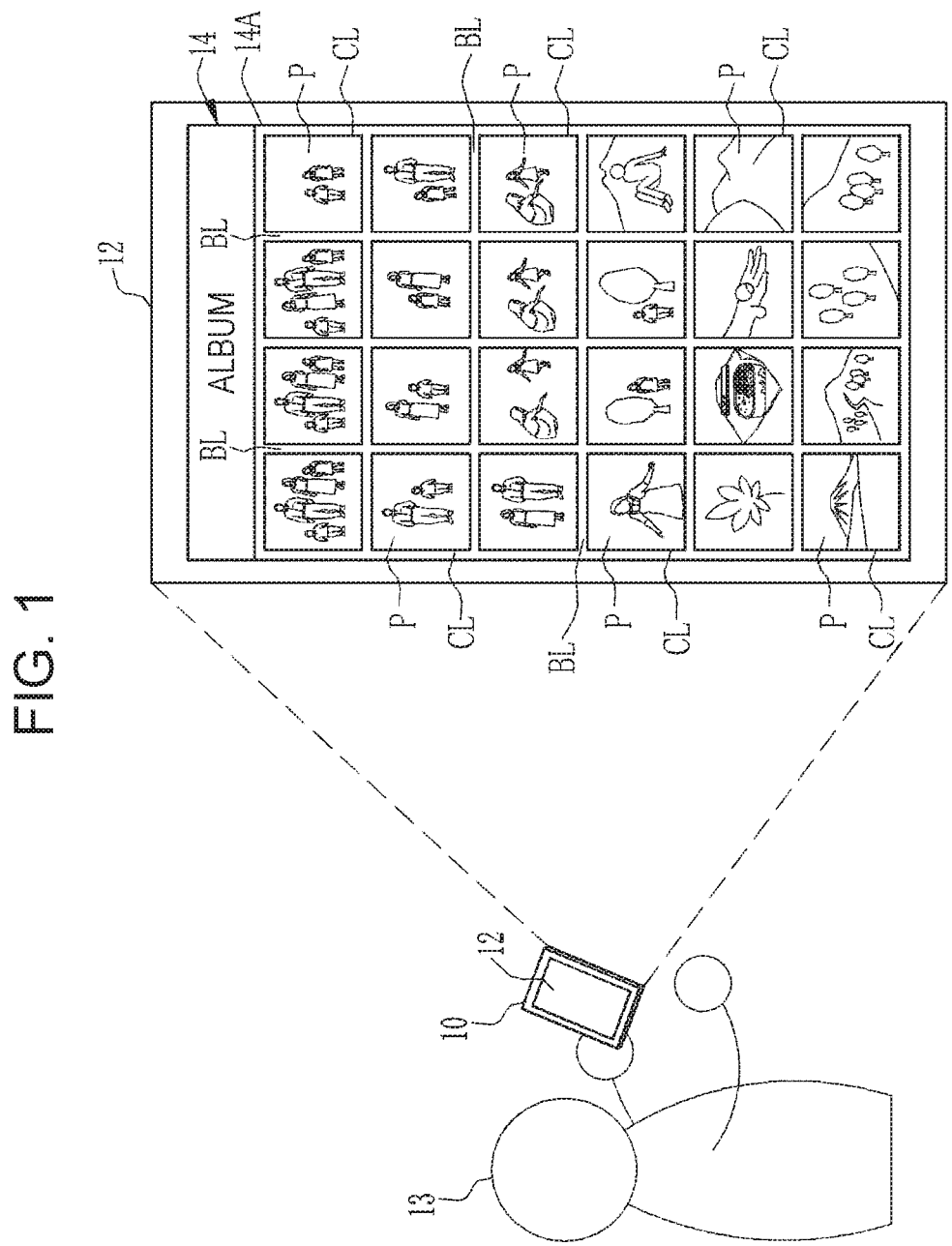
FIG. 1 is an explanatory diagram illustrating a mobile information terminal that functions as an electronic album apparatus.

In FIG. 1, a mobile information terminal 10 is a smartphone, for example. The mobile information terminal 10 functions as a mobile phone and also as a computer that executes various applications called apps. In addition, a camera function is also installed in the mobile information terminal 10, and a photograph can be taken with the mobile information terminal 10.

The mobile information terminal 10 is provided with a touch panel display (hereinafter referred to as touch panel) 12 on a front surface of a main body. As an application, an electronic album application 30 (see FIG. 2 and FIG. 3) is installed in the mobile information terminal 10. The electronic album application 30 is an image viewer program for a user 13 to view a plurality of images P such as photographs. The electronic album application 30 is an operation program for causing a computer to operate as an electronic album apparatus. By starting the electronic album application 30, the mobile information terminal 10, which is a computer, functions as an electronic album apparatus.

For example, the electronic album application 30 generates an album screen 14 and displays the album screen 14 on the touch panel 12. On the album screen 14, an album page 14A on which the plurality of images P are arranged in a certain order is displayed. On the album page 14A, a plurality of image display cells CL (hereinafter simply referred to as display cells), which are blocks in which the images P in the respective frames are arranged, are provided. In an initial state, the display cells CL are set as the same square shape of the same size. On the album page 14A, the display cells CL are arranged in a matrix of a plurality of rows and a plurality of columns, and the images P in the respective frames are arranged in such display cells CL and are generally arranged in a grid form. The grid form means a formation in which block lines BL of the display cells CL extend vertically and horizontally in such a manner that each of the display cells CL forms a box of a grid.

The electronic album application 30 can accept a touch operation on the touch panel 12 and can scroll the album page 14A or select each image P to be displayed in an enlarged manner. The user 13 views the plurality of images P while performing such operation.

Figure 2:
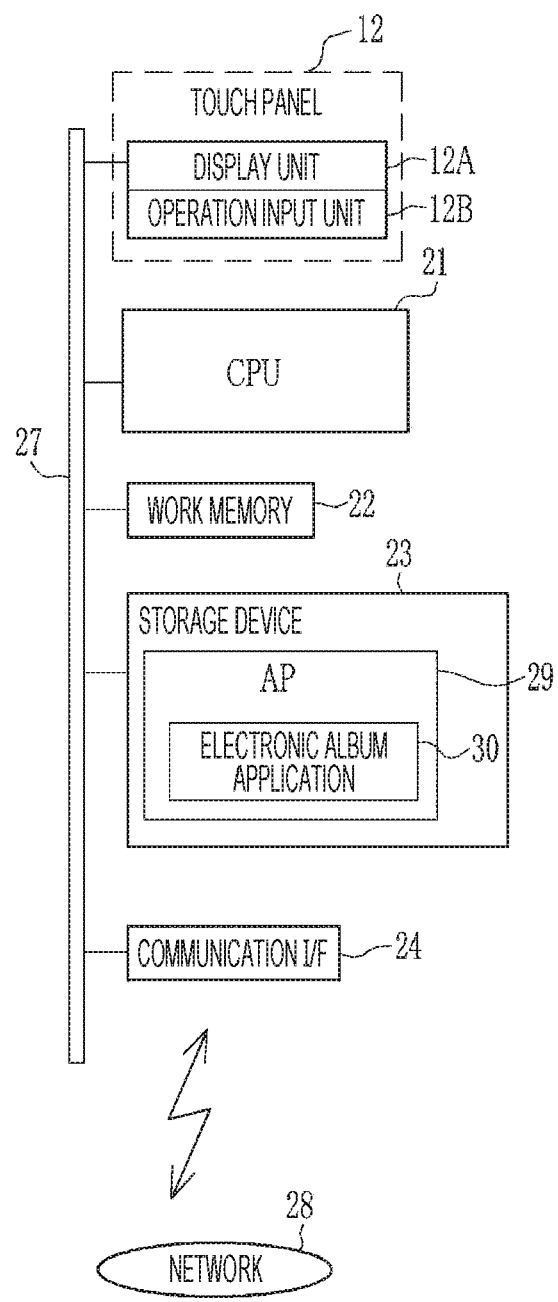
FIG. 2 is a block diagram illustrating an outline of an electrical structure of the mobile information terminal.

As illustrated in FIG. 2, the mobile information terminal 10 includes a central processing unit (CPU) 21, a work memory 22, a storage device 23, a communication interface (I/F) 24, and the touch panel 12. These are connected via a data bus 27.

The work memory 22 is a memory used by the CPU 21 to perform a process and is constituted by a random access memory (RAM). The CPU 21 loads a control program stored in the storage device 23 to the work memory 22 and performs a process in accordance with the program to generally control the units of the mobile information terminal 10.

The communication I/F 24 is, for example, an interface for wireless communication and controls transmission for wireless communication. The interface for wireless communication includes a mobile communication interface for connecting to a mobile communication network, a wireless interface conforming to an IEEE 802.11 series wireless local area network (LAN) standard for connecting to a wireless router, an interface for short-range wireless communication using an infrared ray, and the like. The mobile information terminal 10 can connect to a network 28 such as a mobile communication network or the Internet through the communication I/F 24.

The touch panel 12 is composed of a display unit 12A and an operation input unit 12B. The display unit 12A displays various operation screens including the album screen 14 and the like. The operation input unit 12B is used for inputting a touch operation using a finger of the user 13 as an operation instruction.

The storage device 23 is, for example, a non-volatile semiconductor memory, such as a flash memory or a solid state drive (SSD), and stores a control program and an application program (AP) 29. The application program 29 includes various applications including the electronic album application 30. The application program 29 includes an application program that is pre-installed in the mobile information terminal 10 and also an application program that is optionally downloaded by the user 13 from an application distribution server via the network 28, such as the Internet, and installed in the mobile information terminal 10.

Figure 3:
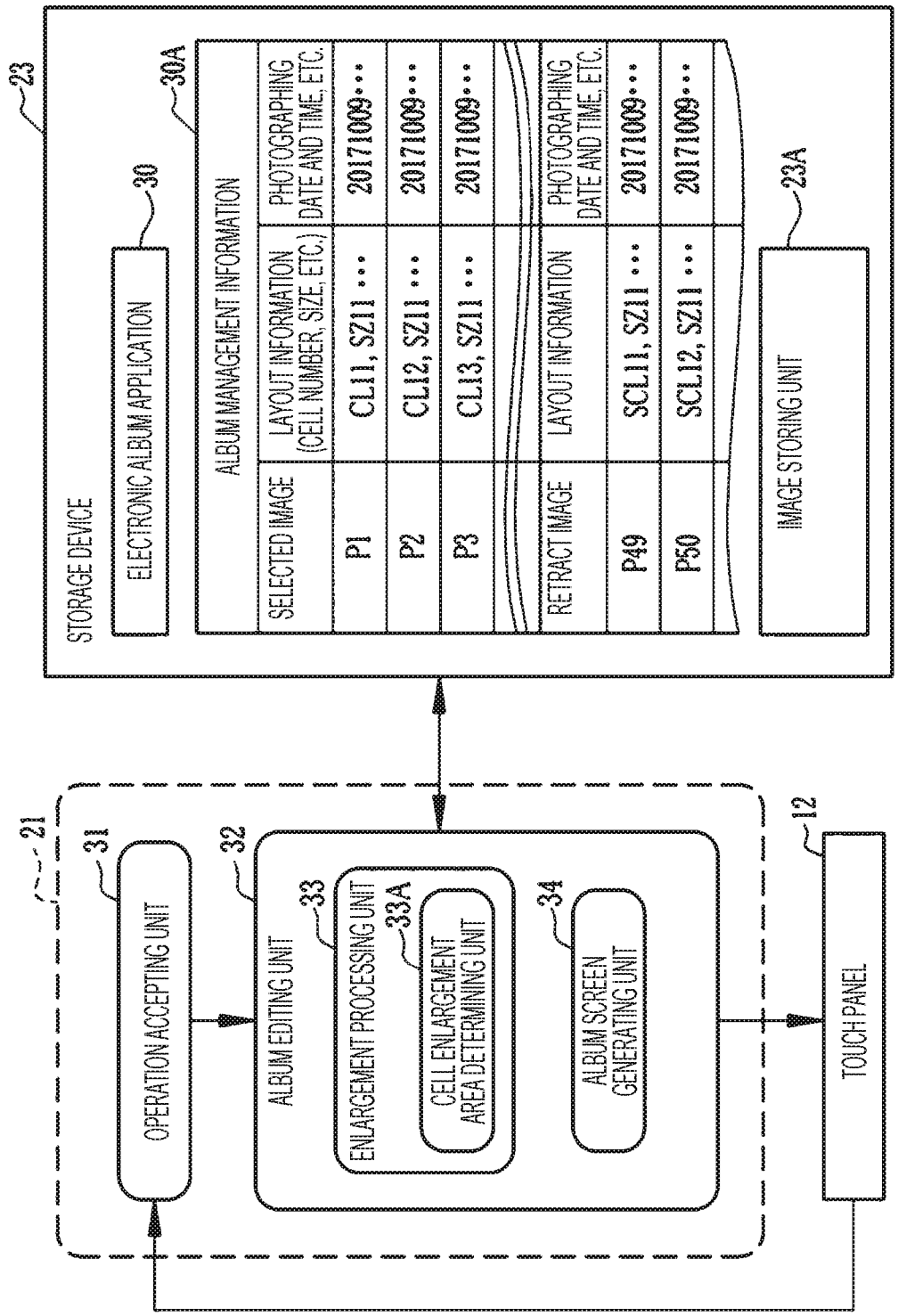
FIG. 3 is a block diagram of functions implemented by a central processing unit (CPU) executing an operation program.

As illustrated in FIG. 3, the storage device 23 has an image storage unit 23A for storing electronic data of images P such as photographs taken by the user 13. In addition, the storage device 23 stores album management information 30A generated by the electronic album application 30.

When the electronic album application 30 is started, the CPU 21 functions as an operation accepting unit 31 and an album editing unit 32. The album editing unit 32 includes an enlargement processing unit 33, a cell enlargement area determining unit 33A, and an album screen generating unit 34.

The operation accepting unit 31 accepts an operation instruction by a touch operation input through an operation screen such as the album screen 14 displayed on the touch panel 12. The touch operation includes a tap operation for tapping the album screen 14, a gesture for tracking the album screen 14 with a finger, and the like. That is, the operation accepting unit 31 functions as an operation accepting unit that accepts a touch operation including a gesture for tracking the album screen 14 with a finger. In addition, an operation button (not illustrated) is provided for a main body of the mobile information terminal 10, and the operation accepting unit 31 also accepts an operation instruction from the operation button.

At the time the electronic album application 30 is started for the first time, the album editing unit 32, for example, reads out all images P stored in the image storage unit 23A and arranges all of the read-out images P on the album page 14A. The album editing unit 32 generates the album screen 14 as a screen for displaying the album page 14A created in this manner. Photographs taken with the mobile information terminal 10 are sequentially added to the image storage unit 23A, and added images P are automatically registered in the album page 14A.

Figure 4:
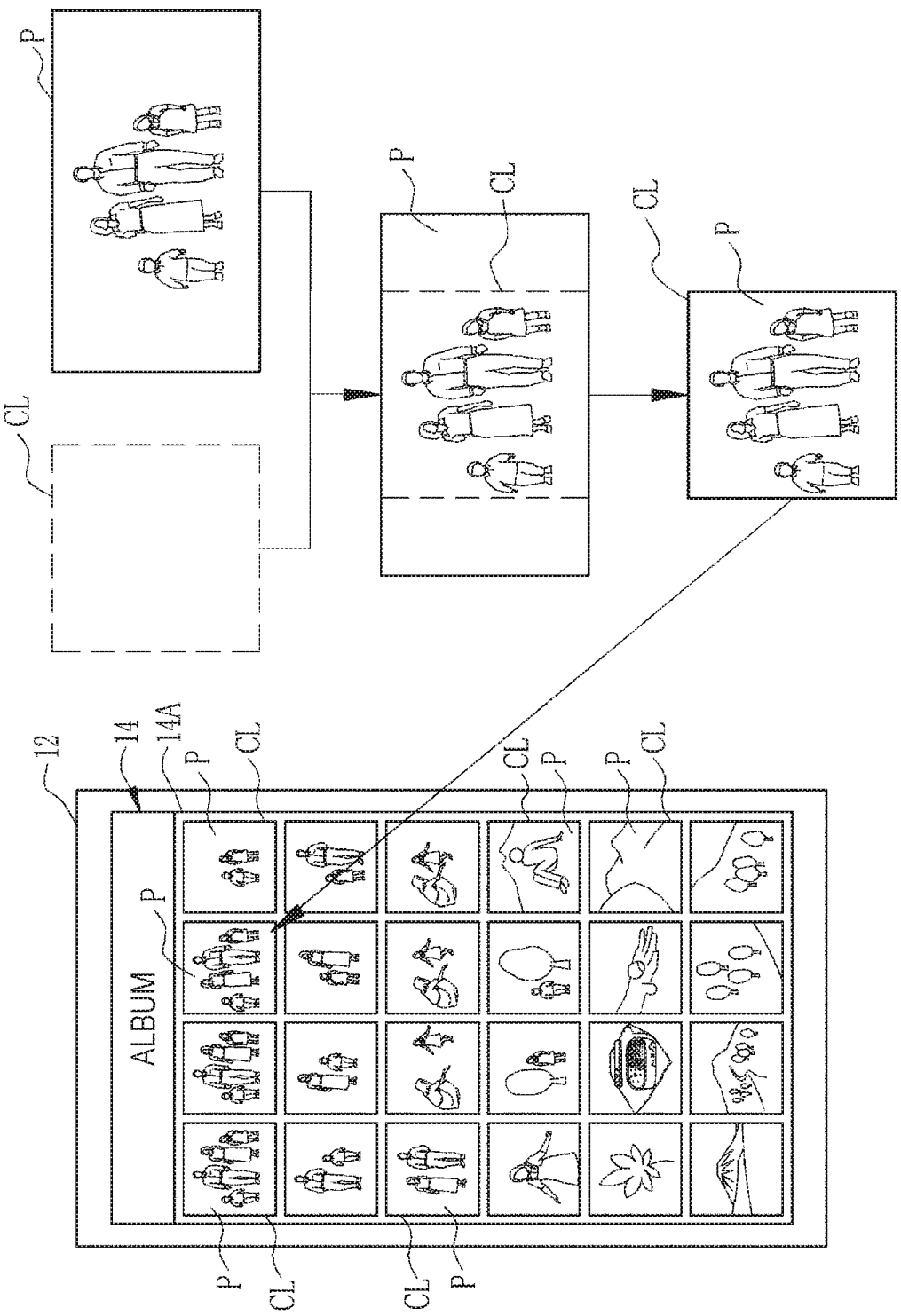
FIG. 4 is an explanatory diagram of a process for arranging images in display cells on an album screen.

As illustrated in FIG. 4, the album page 14A is provided with a plurality of display cells CL in a grid form. The album editing unit 32 arranges the images P in the display cells CL. At this time, the album editing unit 32 trims the images P in accordance with the shape of the display cells CL. In the example in FIG. 4, the display cells CL have a square shape in an initial state. In contrast, the images P have a rectangular shape with an aspect ratio of 16:9. For example, the album editing unit 32 adjusts the size of the images P in such a manner that the height of the images P corresponds with the length of a side of the display cells CL. In addition, the album editing unit 32 trims part of the images P in accordance with the display cells CL. The trimmed part is a display part, and the images P after trimming are arranged on the album page 14A.

An operation instruction for the electronic album application 30 is mainly an album editing instruction regarding editing of an album. The album editing instruction includes an image selection instruction, an image retract instruction, a cell enlargement instruction, and the like.

The image selection instruction is an instruction for selecting an image P to be arranged on the album page 14A. As described above, at the time the electronic album application 30 is started for the first time, all images P in the image storage unit 23A are arranged on the album page 14A, and all images P are selected images. From this state, in response to a retract instruction for retracting an image P from the album page 14A, the image P is retracted from the album page 14A. The retracted image P is accommodated in a retract image accommodating page 14B (see FIG. 5B, hereinafter simply referred to as retract page) as a retract image retracted from the album page 14A. The image P retracted to the retract page 14B is not displayed on the album page 14A. Note that the retract page is provided in a lower part in FIG. 5B, but may also be provided in an upper part.

The image selection instruction is an instruction for selecting a retract image within the retract page 14B as a selected image to be arranged on the album page 14A again. In contrast, the image retract instruction is an instruction for retracting an image P from the album page 14A to the retract page 14B.

Figure 5B:
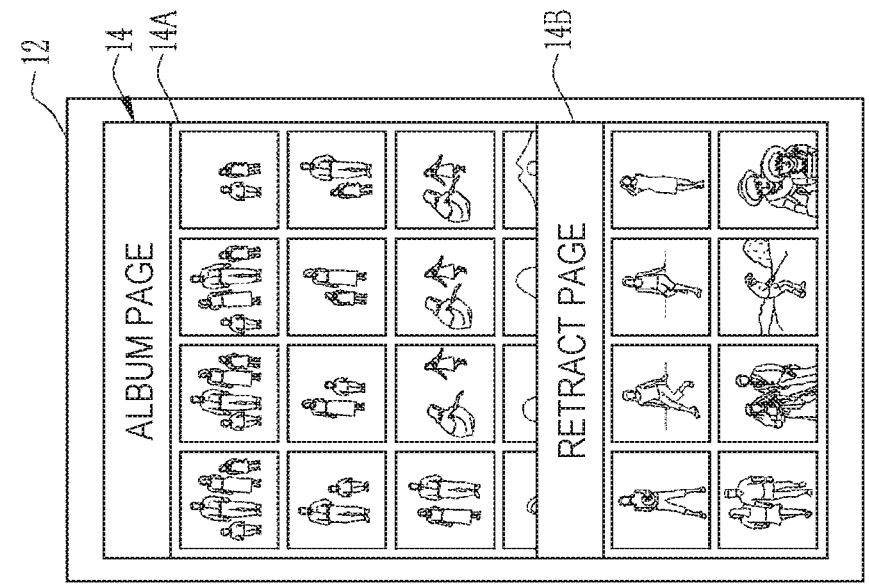
FIGS. 5A and 5B are explanatory diagrams of an album screen for selecting images to be arranged on an album page and retracting images.
Figure 5A:
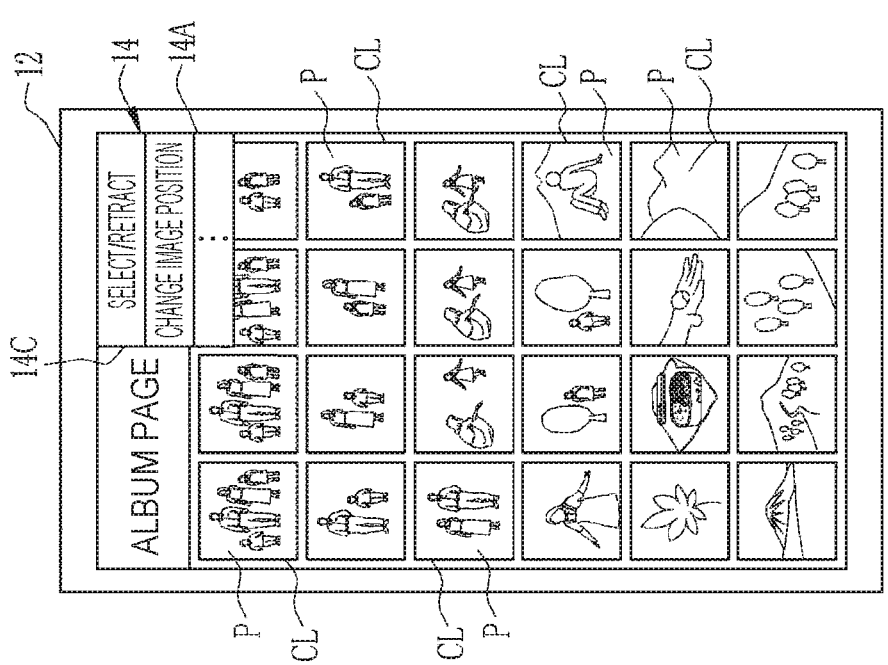

As illustrated in FIGS. 5A and 5B, if the image selection instruction or the image retract instruction is to be issued, an operation is started from an edit menu 14C. As illustrated in FIG. 5A, the edit menu 14C is displayed if, for example, the user 13 performs a tap operation for tapping a predetermined part of a menu bar displayed above the album screen 14. The edit menu 14C includes items such as "select/retract" and "change image position".

If a tap operation is performed on the item "select/retract" in the edit menu 14C, for example, as illustrated in FIG. 5B, the album screen 14 is split into two parts, which are an upper part and a lower part, and the album page 14A and the retract page 14B are respectively displayed in the split regions.

Note that in the edit menu 14C, the item "change image position" is an item for issuing an operation instruction for changing a display cell CL in which an image P is to be arranged. If a tap operation is performed on the item "change image position", the designated image P can be moved from a current display cell CL to another display cell CL, in which the image P is to be arranged, through a predetermined touch operation.

Figure 6A:
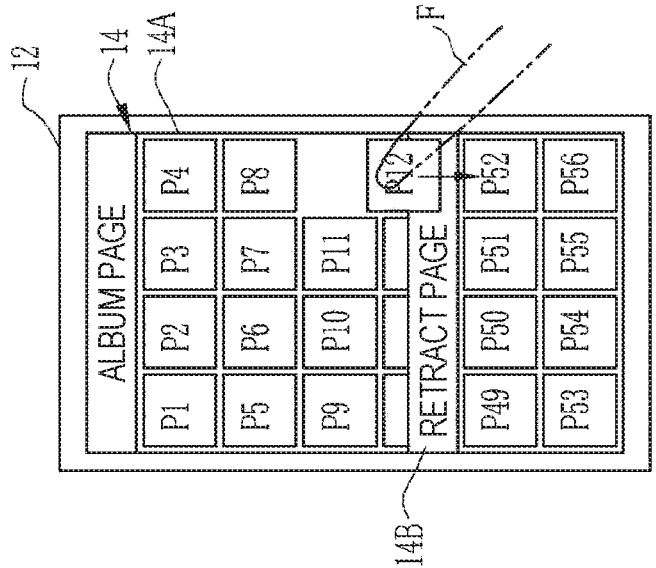
FIGS. 6A and 6B are explanatory diagrams of an operation method for selecting and retracting an image.
Figure 6B:
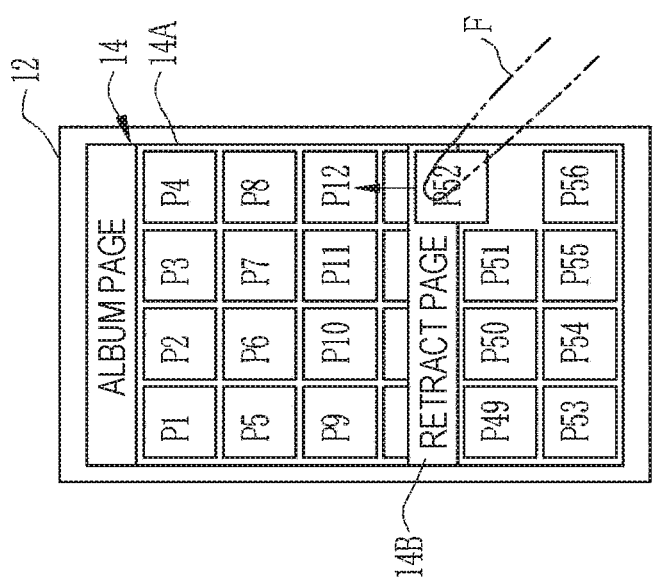

FIGS. 6A and 6B illustrate a state where a tap operation is performed on the item "select/retract" in the edit menu 14C and the album screen 14 is split into two parts, the album page 14A and the retract page 14B. Although photographic subjects are illustrated in the images P in FIGS. 5A and 5B, the photographic subjects in the images P are omitted from illustration in FIGS. 6A and 6B. Instead, the images P in FIGS. 6A and 6B are denoted by individual identification numbers P1, P2, P3 . . . . FIGS. 6A and 6B are each a schematic diagram of the album screen 14 briefly illustrating the arrangement state of the images P.

In a state where the album screen 14 is split into two parts in this manner and the album page 14A and the retract page 14B are displayed in the upper part and the lower part, it is possible to perform an operation for designating an image P and moving the designated image P from one page to the other page.

For example, as illustrated in FIG. 6A, if an image P52 within the retract page 14B is touched by a finger F and a drag operation for dragging the image P52 to the album page 14A while keeping the touch state is performed, the designated image P is moved from the retract page 14B to the album page 14A. An image selection operation is performed in this manner.

On the other hand, as illustrated in FIG. 6B, in contrast to image selection, if a drag operation toward the retract page 14B is performed on an image P12 designated in the album page 14A by the finger F, the designated image P12 is retracted from the album page 14A and is accommodated in the retract page 14B.

Referring back to FIG. 3, in the album management information 30A, information of selected images that are images P to be arranged on the album page 14A and retract images that are images P retracted from the album page 14A and accommodated in the retract page 14B is registered. The album screen generating unit 34 refers to the album management information 30A, reads out images P in the image storage unit 23A, and arranges the images P on the album page 14A or the retract page 14B. In this manner, the layout of the images P within the album page 14A and the retract page 14B is determined.

In the example of the album management information 30A in FIG. 3, images P1, P2, P3 . . . are registered as selected images, and layout information and information such as photographing date and time are also registered for the selected images. The layout information includes cell numbers CL11, CL12, CL13 . . . indicating the positions of display cells CL on the album page 14A, a size SZ11 of the display cells CL, and the like. The cell number is identification information for identifying the position of each display cell CL.

As the cell numbers CL11, CL12, CL13 . . . , the first digit of two-digit numbers following "CL" indicates the row and the second digit indicates the column. For example, CL11 indicates a cell number of a display cell CL located in a first row and a first column, and CL12 indicates a cell number of a display cell CL located in the first row and a second column. That is, in the example in FIG. 3, the image P1, which is one of the selected images, is arranged in a display cell CL with the cell number CL11 in the first row and the first column within the album page 14A. Similarly, the image P2 is arranged in a display cell with the cell number CL12 in the first row and the second column within the album page 14A.

As the size SZ11, the second digit of two-digit numbers following "SZ" indicates the height and the first digit indicates the width. Although the size of the display cell CL can be enlarged, instead of changing to an arbitrary size, the size is changed stepwise in units of a reference size, which is the smallest size of the display cell CL, to be N times as large as the reference size. Herein, N is a natural number of greater than or equal to 1. SZ11 indicates that the size is the reference size and the shape is a square with equal height and width.

Twice as large as the reference size means a size of two boxes of display cells CL of the reference size. In this case, the shape is a rectangle in which two boxes of display cells CL are vertically or horizontally arranged in series, that is, a vertically oriented rectangle of two rows and one column or a horizontally oriented rectangle of one row and two columns. Four times as large as the reference size means a size of four boxes of the reference size. The size of four boxes of the reference size may be a vertically oriented rectangle of four rows and one column or a horizontally oriented rectangle of one row and four columns or may be a square of two rows and two columns, with the height and the width both being twice as large as the reference size.

Similarly, in the album management information 30A in FIG. 3, images P49, P50 . . . are registered as retract images, and layout information and information such as photographing date and time are also registered for the images P49, P50 . . . . As the layout information, information of cell numbers SCL11 and SCL12 and sizes SZ11 and SZ11 of display cells in which the images P49, P50 . . . are arranged is registered. In order to be distinguished from cell numbers of display cells CL of selected images, the cell numbers of display cells CL on the retract page 14B are denoted by the symbol "SCL". As in the case of selected images, two-digit numbers following "SCL" indicate a row number and a column number.

The album editing instruction further includes a temporary enlargement instruction, a page scrolling instruction, and the like. The temporary enlargement instruction is for temporarily displaying, in an enlarged manner, an image P selected within the album page 14A. The page scrolling instruction for scrolling the album page 14A to display a hidden part. As the temporary enlargement instruction, upon a double tap operation for tapping a desired image P on the album page 14A twice in succession, the image P only in one frame is displayed in an enlarged manner on the entire screen of the touch panel 12. When the enlarging display ends, the original album page 14A is restored. The page scrolling instruction is issued by, for example, an operation for touching the album page 14A with the finger F and swiping the album page 14A in the vertical direction.

Figure 8C:
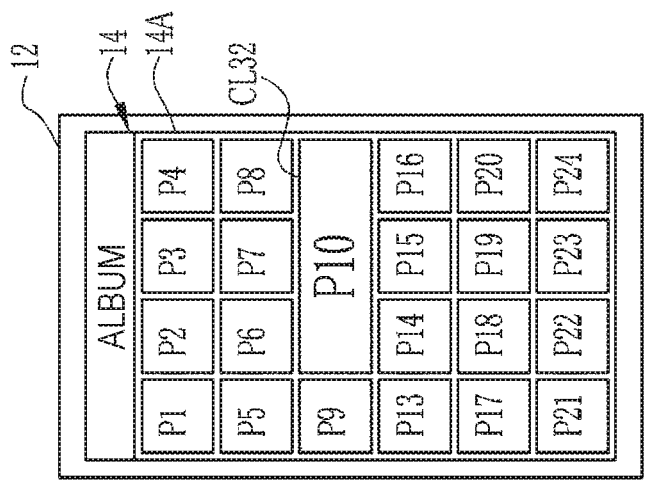
FIGS. 8A to 8C are schematic diagrams illustrating operations in the process in FIGS. 7A and 7B.
Figure 8B:
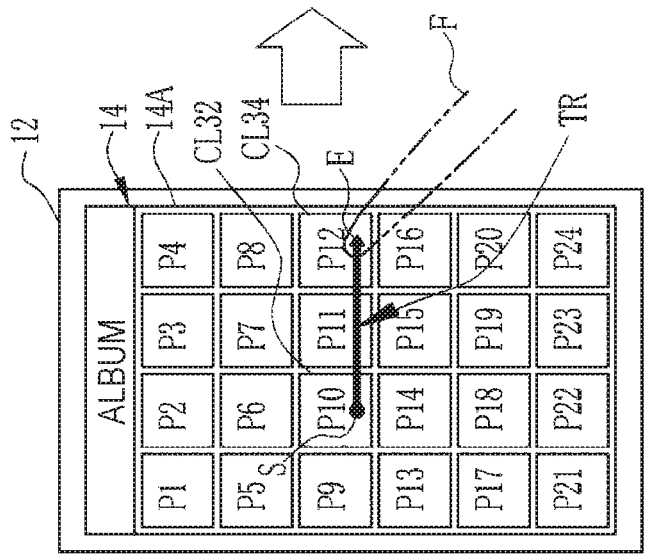

The album editing instruction further includes a cell enlargement instruction independently of the temporary enlargement instruction. The cell enlargement instruction is an instruction for enlarging, within the album page 14A, the size of a display cell CL provided within the album page 14A. If the display cell CL is enlarged, the display size of an image P arranged in the display cell CL is also enlarged in accordance with the size of the enlarged display cell CL. The cell enlargement instruction is input by a gesture using the finger F as illustrated in FIG. 7A and FIGS. 8A and 8B on the album screen 14.

FIGS. 7A and 7B are explanatory diagrams illustrating content of an enlargement process. FIG. 7A illustrates a state of a display cell CL (CL32 in the example) that is an enlargement target and an image P (P10 in the example) before enlargement, and FIG. 7B illustrates a state of the enlargement target after enlargement. FIGS. 8A to 8C illustrate an operation method of the enlargement process illustrated in FIGS. 7A and 7B by schematic diagrams similar to FIGS. 6A and 6B.

As described above, the display cell CL can be enlarged to be N times as large as the reference size in units of the reference size. The example in FIGS. 7A and 7B is an example of enlarging a display cell CL (CL32 in the example) of one box, which is the reference size, illustrated in FIG. 7A to a display cell CL of one row and three columns, the size of which is three boxes, which is three times as large as the reference size, as illustrated in FIG. 7B.

Figure 8A:
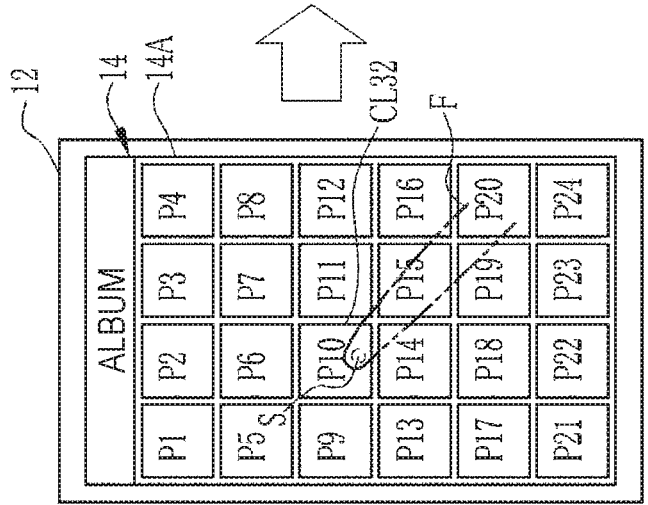

As illustrated in FIG. 8A, a display cell CL that is an enlargement target is designated by performing a press-and-hold operation with a finger F on an image P arranged in the display cell CL to be designated. The press-and-hold operation means an operation for touching the image P with the finger F and keeping the touch state over a certain period or longer. Upon the press-and-hold operation, the display cell CL that is the enlargement target and the image P are designated. In this example, as indicated by a start point S, the display cell CL32 and the image P10 are designated as the enlargement target.

In response to acceptance of the press-and-hold operation as the touch operation, the operation accepting unit 31 determines, on the basis of coordinate information of the position where the press-and-hold operation is performed, the display cells CL32, which is one of the display cells CL as the enlargement target. That is, the operation accepting unit 31 functions as an enlargement target determining unit.

After the enlargement target has been designated, as illustrated in FIG. 8B, the user 13 touches the enlargement target again with the finger F and performs a swipe gesture for tracking the album page 14A with the finger F while keeping the touch state, an enlargement area is designated. The gesture is specifically a swipe gesture for tracking the album page 14A with the one finger F from the display cell CL that is the enlargement target as the start point S to an end point E. As illustrated in FIG. 8B, a track TR of the swipe gesture in the example is a straight line horizontally extending from, as the start point S, the display cell CL32 in which the image P10 is arranged, to, as the end point E, a display cell CL34 in which an image P12 is arranged.

If a gesture on the album screen 14 is detected, the operation accepting unit 31 determines the operation instruction to which the detected gesture corresponds. If, subsequently to the press-and-hold operation illustrated in FIG. 8A, the swipe gesture illustrated in FIG. 8B is detected, the operation accepting unit 31 determines that the gesture is a cell enlargement instruction. As information of the cell enlargement instruction, the operation accepting unit 31 inputs coordinate information for identifying the track TR to the album editing unit 32.

As described above, in the example, prior to the swipe gesture, the enlargement-target display cell CL32 is designated by a press-and-hold operation. If this press-and-hold operation is performed, the operation accepting unit 31 distinguishes the subsequent swipe gesture from a scroll operation for scrolling the entire album page 14A.

Note that the operation for designating the enlargement-target display cell CL is not necessarily the press-and-hold operation. For example, instead of the press-and-hold operation, a single tap operation for tapping the enlargement-target display cell CL once may be performed. Also with the single tap operation, the subsequent swipe gesture can be distinguished from the scroll operation.

In addition, as the operation for designating the enlargement-target display cell CL, in addition to the single tap operation and the press-and-hold operation, the following methods are also considered. For example, in a case of enlarging the display cell CL, first, an operation menu screen (not illustrated) is displayed, and an operation item "enlarge display cell" within the operation menu screen is selected by the user 13. By an operation for selecting this operation item, the operation accepting unit 31 transitions to a display cell enlargement mode. The operation accepting unit 31 determines the enlargement target and the cell enlargement area through the subsequent swipe gesture. In this case, the operation accepting unit 31 determines, as the enlargement target, a display cell CL that is present at the position of a start point S in the swipe gesture after transition to the display cell enlargement mode. This eliminates the necessity of the press-and-hold operation or the single tap operation as the operation for designating the enlargement target.

In addition, in order to distinguish the swipe gesture and the scroll operation on the album page 14A from each other, the following method may be performed. That is, a scroll bar is provided in an end portion of the album page 14A, and the scroll operation on the album page 14A is performed through this scroll bar. In this case, any touch in a region where display cells CL are present within the album page 14A is not recognized as the scroll operation, and only the swipe gesture is accepted in the region where display cells CL are present. Regarding the designation of the enlargement target in this case, also, regardless of the press-and-hold operation or the single tap operation, a display cell CL at the position of a start point S of the swipe gesture may be accepted as the enlargement-target display cell CL.

In this manner, without designation of the enlargement-target display cell CL by the single tap operation or the press-and-hold operation, the enlargement-target display cell CL can be designated only by the swipe gesture.

In addition, by a method for selecting the display cell enlargement mode from the operation menu or a method for providing the scroll bar, the scroll operation on the album page 14A and the swipe gesture for enlarging the display cell CL32 can be distinguished from each other. In a case where a swipe gesture in the vertical direction illustrated in FIGS. 12A and 12B, FIGS. 13A and 13B, and FIG. 14, which will be described later, is performed, which is described later, the distinction between the scroll operation on the album page 14A and the swipe gesture for enlarging the display cell CL32 becomes a particular issue. However, by the above method, the swipe gesture and the scroll operation can be clearly distinguished from each other.

In accordance with the track TR identified on the basis of the coordinate information, the cell enlargement area determining unit 33A in the album editing unit 32 determines the number of boxes in units of the reference size as the size of the display cell CL after enlargement. That is, the cell enlargement area determining unit 33A determines the number of display cells CL (the number of boxes) having the reference size as the size of the enlarged display cell CL.

Furthermore, in addition to the size of the enlarged display cell CL, in accordance with the track TR, the cell enlargement area determining unit 33A determines the shape of the enlargement area that is the area of the display cell CL after enlargement. In accordance with the size of the enlarged display cell CL, the enlargement processing unit 33 determines the enlargement size of the image P.

In this example, the cell enlargement area determining unit 33A determines that an area including a plurality of display cells CL overlapping with the track TR as the enlargement area.

As illustrated in FIG. 8B, the number of display cells CL overlapping with the track TR corresponds to three boxes, and the track TR is a straight line horizontally extending from the start point S to the end point E. Thus, the cell enlargement area determining unit 33A determines that the size of the enlargement area is three boxes of the reference size and the shape of the enlargement area is a horizontally oriented rectangle of one row and three columns, which is one box as the height and three boxes as the width. In addition, in accordance with the size of the enlargement area, the cell enlargement area determining unit 33A determines the enlargement size of the image P.

As illustrated in FIG. 8C, the enlargement processing unit 33 enlarges the display cell CL32, which has been a square of the reference size of one row and one column, which is one box as the height and the width before enlargement, to the horizontally oriented rectangle of one row and three columns in accordance with the size and the shape of the determined enlargement area.

In addition, if the cell enlargement is performed on the display cell CL in this manner, on the album page 14A, display cells CL that have been present before enlargement within the enlargement area occupied by the enlarged display cell CL are deleted. Furthermore, images arranged in the deleted display cells CL are retracted to the retract page 14B.

In the example in FIGS. 7A and 7B and FIGS. 8A to 8C, the enlargement target is the display cell CL32. On the album page 14A, within the enlargement area to be occupied by the enlarged display cell CL32 after enlargement of the display cell CL32, display cells CL33 and CL34 have been present before enlargement. Thus, in accordance with the enlargement of the display cell CL32, the display cells CL33 and CL34 are deleted. In addition, images P11 and P12 arranged in the display cells CL33 and CL34 are retracted from the album page 14A to the retract page 14B.

FIGS. 9A and 9B illustrate changes of the album management information 30A if the cell enlargement illustrated in FIGS. 7A and 7B and FIGS. 8A to 8C is performed. FIG. 9A illustrates an example of the album management information 30A before enlargement, and FIG. 9B illustrates an example of the album management information 30A after enlargement. In the album management information 30A before enlargement illustrated in FIG. 9A, the images P10, P11, P12 . . . are registered as selected images. As the layout information of the image P10, the cell number being CL32, the arrangement position being the display cell CL32, the size being SZ11, and the shape being a square of the reference size of one row and one column with an aspect ratio of 1:1 are registered. In addition, as the layout information of the images P11 and P12, the cell numbers being CL33 and CL34 and the size being SZ11 are registered.

Furthermore, in the layout information of the retract page 14B, as the layout information of images P49, P50, and P51, the cell numbers being SCL11, SCL12, and SCL13 and the size being SZ11 are registered.

In contrast, as illustrated in FIG. 9B, in the album management information 30A after cell enlargement illustrated in FIGS. 7A and 7B and FIGS. 8A to 8C, the size of the display cell CL32 of the image P10 is changed from SZ11 to SZ13. As described above, SZ13 indicates that the size is a horizontally oriented rectangle of one row and three columns. In addition, the images P11 and P12 are retracted from the album page 14A and accommodated in the retract page 14B. In accordance with retract of the images P11 and P12, the display cells CL33 and CL34 are deleted on the album page 14A.

On the other hand, in the album management information 30A, the images P11 and P12 are registered in the retract page 14B. In addition, since the images P11 and P12 are arranged in the display cells SCL11 and SCL12, which are two boxes from the top of the retract page 14B, positions of the display cells SCL of the images P49 to P51 are shifted backward by two boxes. Specifically, the images P49 and P50 are arranged in the display cells SCL11 and SCL12 before enlargement as illustrated in FIG. 9A, but are arranged in the display cells SCL13 and SCL14 after enlargement as illustrated in FIG. 9B.

Figure 10:
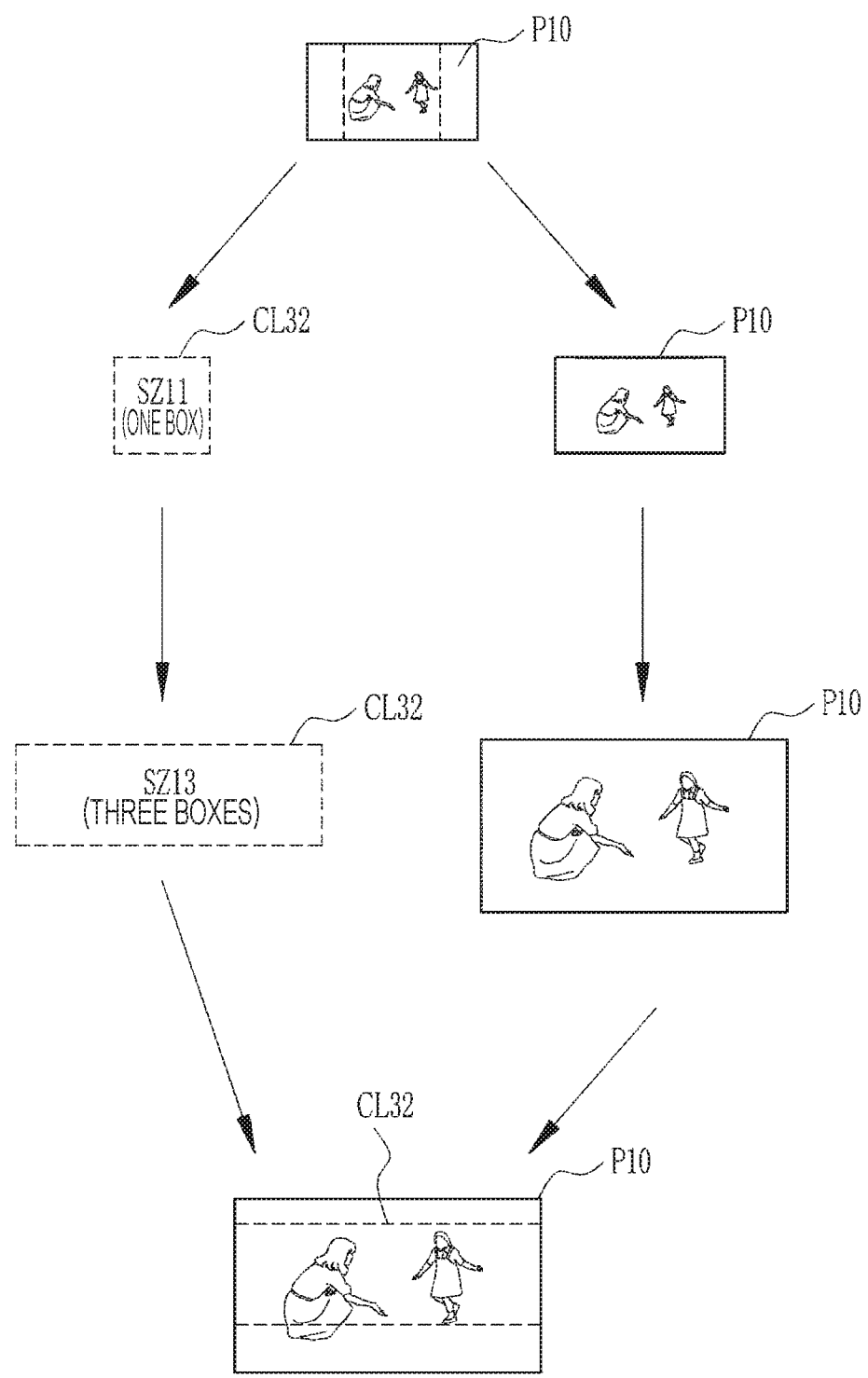
FIG. 10 is an explanatory diagram of a trimming process in a case of FIGS. 7A and 7B.

In addition, as illustrated in FIG. 10, for the enlargement-target image P10, the enlargement processing unit 33 trims part of the enlarged image P10 in accordance with the shape of the display cell CL32 and arranges the trimmed image P10 in the display cell CL32.

As illustrated in FIG. 10, the shape of the original image of the image P10 is, for example, a horizontally long image with an aspect ratio of 16:9. In contrast, as illustrated in FIG. 7A and FIG. 8A, as denoted by SZ11 (one box), the display cell CL32 before enlargement is a square shape of the reference size of one box. If the aspect ratio differs between the display cell CL32 and the image P10 as above, part of the image P10 is trimmed in accordance with the shape of the display cell CL32. In the example in FIG. 10, in an example before enlargement, the display size of the image P10 is determined in such a manner that the height of the image P10 corresponds with the height of the display cell CL32. In addition, part of the image P10 is trimmed in accordance with the width of the display cell CL32. In this manner, the image P10 is partly displayed in accordance with the shape of the display cell CL32 on the album page 14A.

On the other hand, after enlargement, as denoted by SZ13 (three boxes), the display cell CL32 is enlarged to a horizontally oriented rectangle of one row and three columns. In accordance with the size and the shape of the display cell CL32, the size of the image P10 is enlarged while keeping the aspect ratio. After enlargement, the image P10 is enlarged in such a manner that the width of the image P10 corresponds with the width of the display cell CL32. In addition, part of the image P10 is trimmed in accordance with the height of the display cell CL32.

Figure 11A:
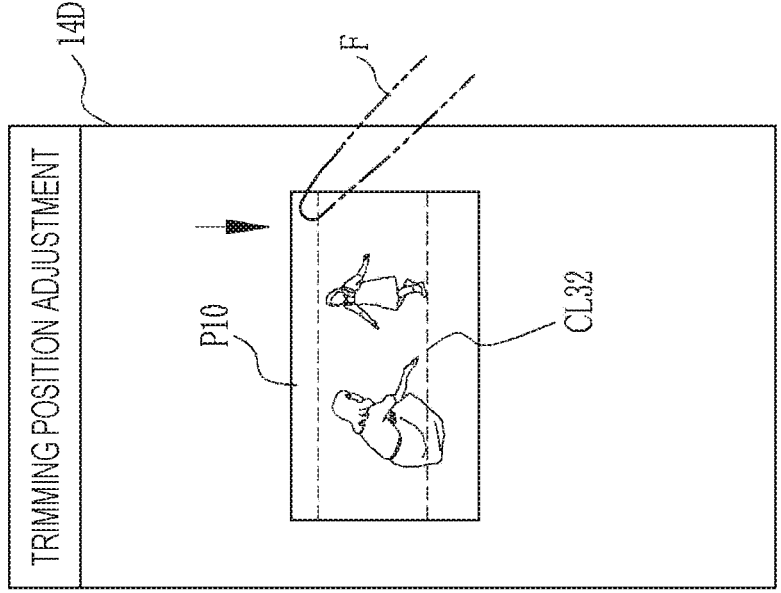
FIGS. 11A and 11B are explanatory diagrams of a method for adjusting a trimming position and illustrate a state where a display cell CL and an image P are relatively moved.
Figure 11B:
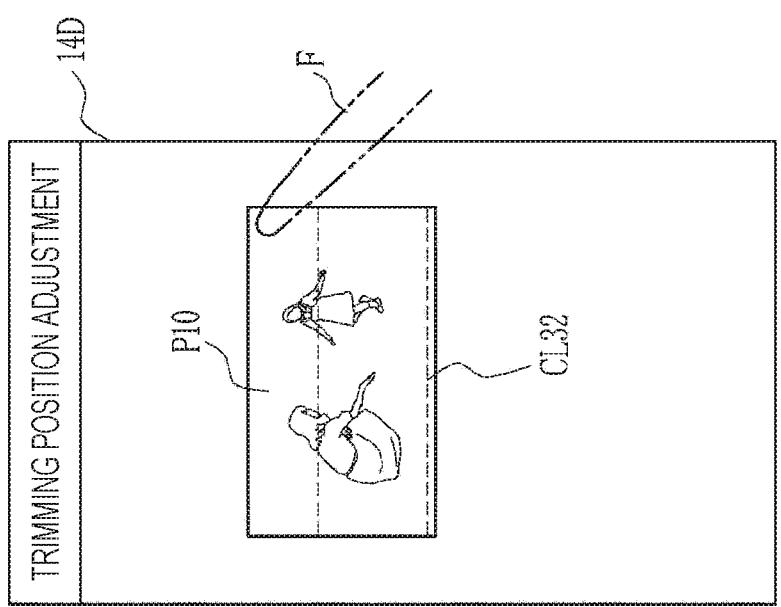

In addition, as illustrated in FIGS. 11A and 11B, the display part of the image P (the image P10 in the example) trimmed in accordance with the shape of the display cell CL is changeable. On the album screen 14, if a predetermined operation for designating the image P as a trimming target within the album page 14A is performed, a trimming position adjustment screen 14D illustrated in FIGS. 11A and 11B are displayed. The predetermined operation herein is, for example, a double tap operation for tapping the image P with the finger F twice in succession within the album page 14A.

On the trimming position adjustment screen 14D, the image P is displayed with the aspect ratio of the original image, and the display cell CL (the display cell CL32 in the example) is displayed to overlap with the image P. The position of the display cell CL is fixed, and the position of the image P can be moved vertically and horizontally relative to the display cell CL. As illustrated in FIGS. 11A and 11B, if the finger F touches the image P and the image P is dragged in this state, the position of the image P is moved relative to the display cell CL. Through such an operation, the image P is moved in such a manner that a desired display part of the image P is located within the display cell CL, and the trimmed display part is adjusted. When the adjustment of the trimming position is completed, for example, by performing a double tap operation on the image P, the album page 14A is restored. On the album page 14A, the display part of the image P after adjustment is displayed in the display cell CL.

Note that the trimming position may be adjusted automatically through an image analysis process. For example, if a human face is photographed as a photographic subject of the image P, the album editing unit 32 recognizes the human face through image analysis. Then, within the image P, the album editing unit 32 determines the trimming position in such a manner that the part where the recognized face is present falls within the display cell CL.

Figure 12B:
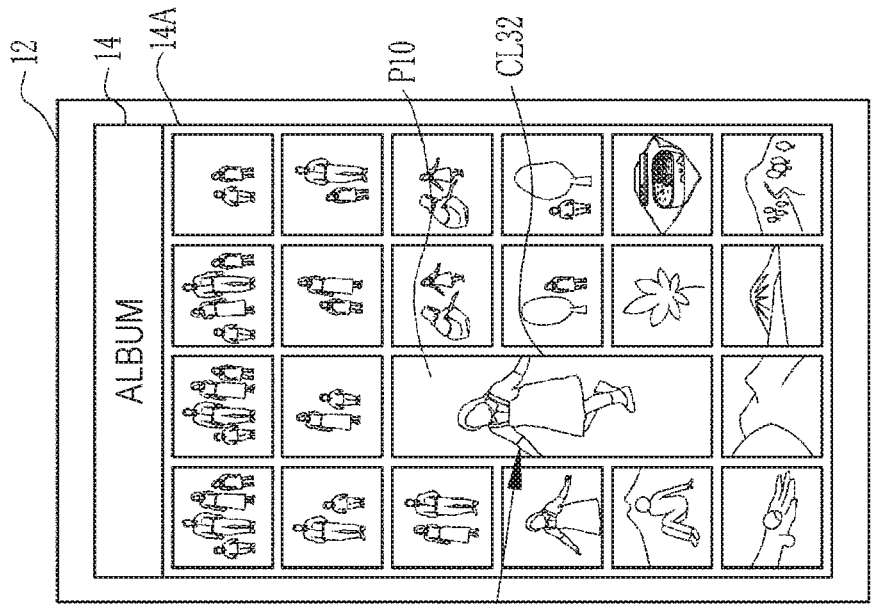
FIGS. 12A and 12B are explanatory diagrams of a process for enlarging a display cell of a reference size to a size of three rows and one column.
Figure 12A:
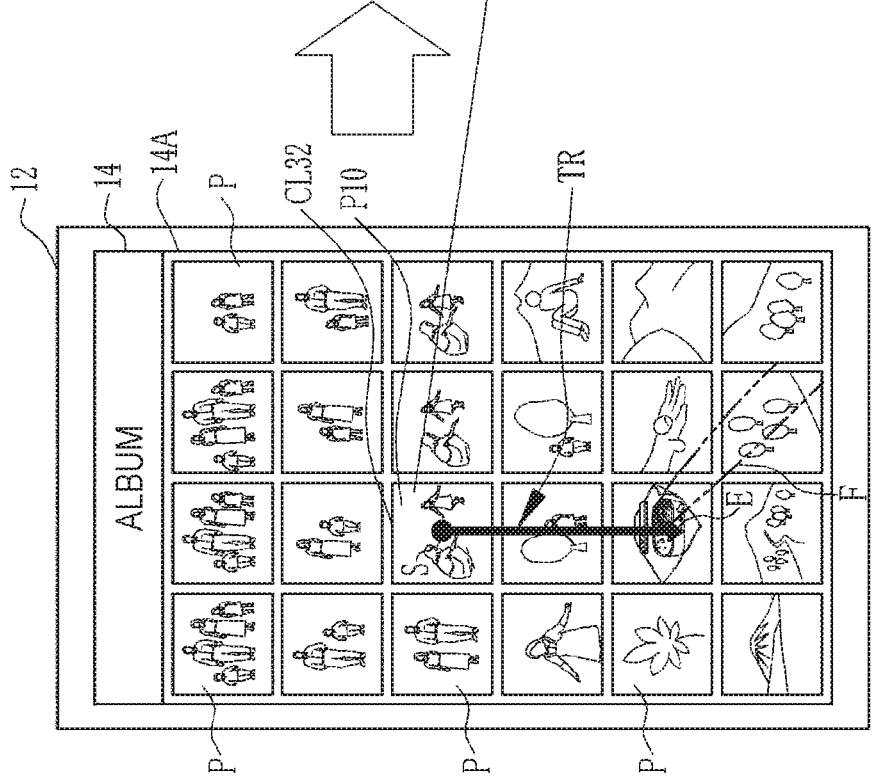

The size and the shape of the enlargement area of the display cell CL are arbitrary and not limited to a horizontally long shape of one row and three columns. For example, as illustrated in FIGS. 12A and 12B, FIGS. 13A and 13B, and FIG. 14, a display cell CL32 of the reference size of one row and one column may be changed to a vertically long shape of three rows and one column. As illustrated in FIG. 12A and FIG. 13A, a user 13 designates the display cell CL32 of the reference size of one row and one column as an enlargement target by a press-and-hold operation. Subsequently, the user 13 swipes a finger F from the display cell CL32 as a start point S to a display cell CL52 linearly and vertically.

On the basis of a track TR of the finger F, the cell enlargement area determining unit 33A determines that an enlargement area of the display cell CL32 as a vertically oriented rectangle of three rows and one column. Then, as illustrated in FIG. 12B and FIG. 13B, the display cell CL32 is vertically enlarged, and the size of an image P10 is enlarged in accordance with the enlargement area of the enlarged display cell CL32.

Figure 14:
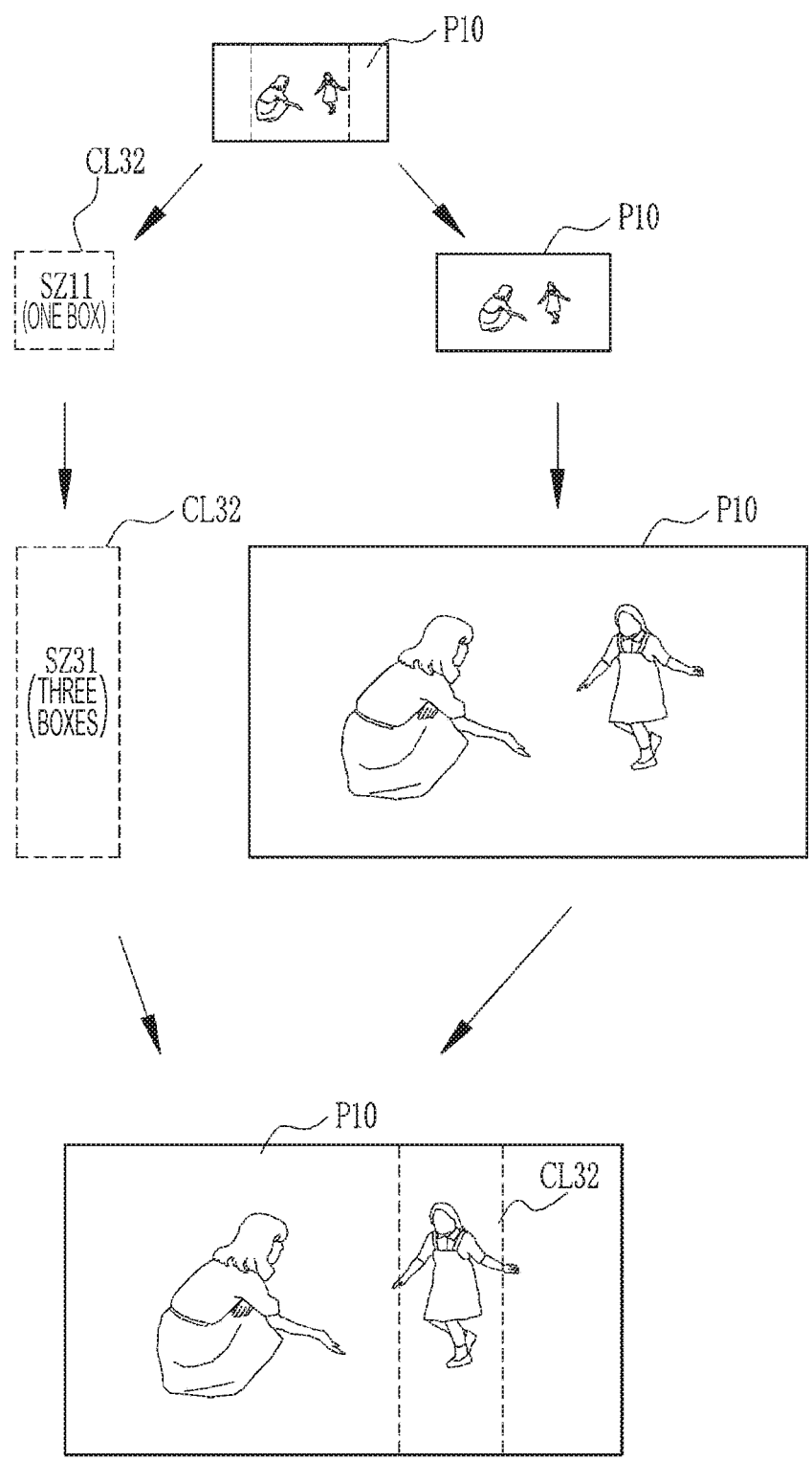
FIG. 14 is an explanatory diagram of a trimming process in a case of FIGS. 12A and 12B.

The enlargement and trimming of the image P10 in the example are performed as illustrated in FIG. 14. The enlargement processing unit 33 enlarges the image P10 while keeping the aspect ratio in such a manner that the height of the image P10 corresponds with the height of the display cell CL32 of three rows and one column after enlargement. Then, part of the image P10 is trimmed in accordance with the size and the shape of the vertically long display cell CL32 of three rows and one column corresponding to the size (SZ31) of three boxes of the reference size. The trimmed part of the image P10 is displayed in the enlarged display cell CL32.

Figure 16B:
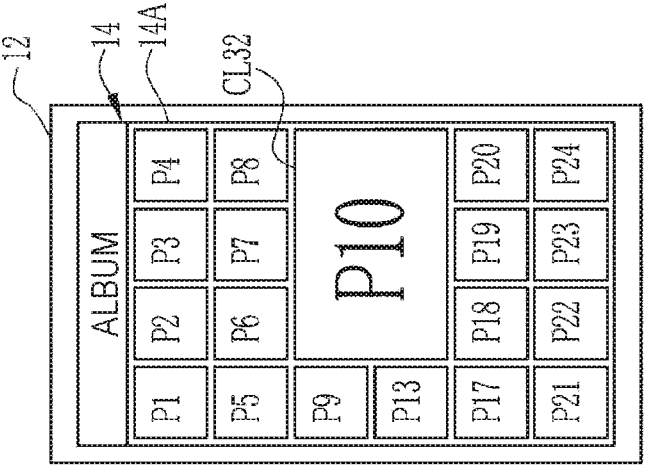
FIGS. 16A and 16B are schematic diagrams illustrating an operation in the process in FIGS. 15A and 15B.
Figure 16A:
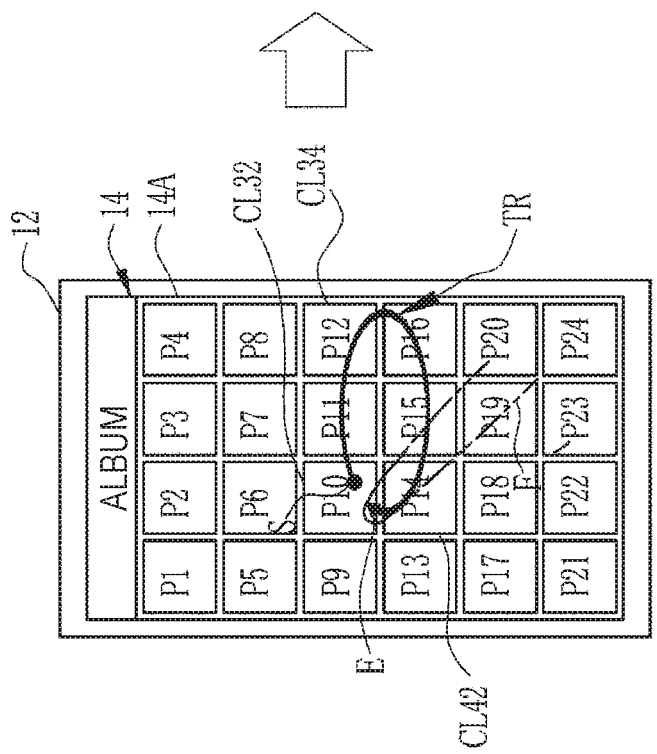

In addition, as illustrated in FIGS. 15A and 15B, FIGS. 16A and 16B, and FIG. 17, a display cell CL32 of the reference size of one row and one column can be enlarged to a rectangle of two rows and three columns. In this case, as illustrated in FIG. 15A and FIG. 16A, a user 13 designates the display cell CL32 of the reference size of one row and one column as an enlargement target by a press-and-hold operation, and then swipes a finger F to draw an ellipse that overlaps with display cells CL of two rows and three columns. Specifically, the user 13 swipes the finger F to draw an ellipse from the display cell CL32 as a start point S to an end point E being the display cell CL32 that is the same as the start point S through display cells CL33, CL34, CL44, CL43, and CL42.

On the basis of a track TR of the finger F, the cell enlargement area determining unit 33A determines that an enlargement area of the display cell CL32 is a rectangle of two rows and three columns. Then, as illustrated in FIG. 15B and FIG. 16B, the display cell CL32 is enlarged, and the size of an image P10 is enlarged in accordance with the enlargement area of the enlarged display cell CL32.

The enlargement and trimming of the image P10 in the example are performed as illustrated in FIG. 17. The enlargement processing unit 33 enlarges the image P10 while keeping the aspect ratio in such a manner that the height of the image P10 corresponds with the height of the display cell CL32 of two rows and three columns after enlargement. Then, part of the image P10 is trimmed in accordance with the size and the shape of the display cell CL32 of two rows and three columns corresponding to the size (SZ23) of six boxes of the reference size. The trimmed part of the image P10 is displayed in the enlarged display cell CL32.

Figure 18:
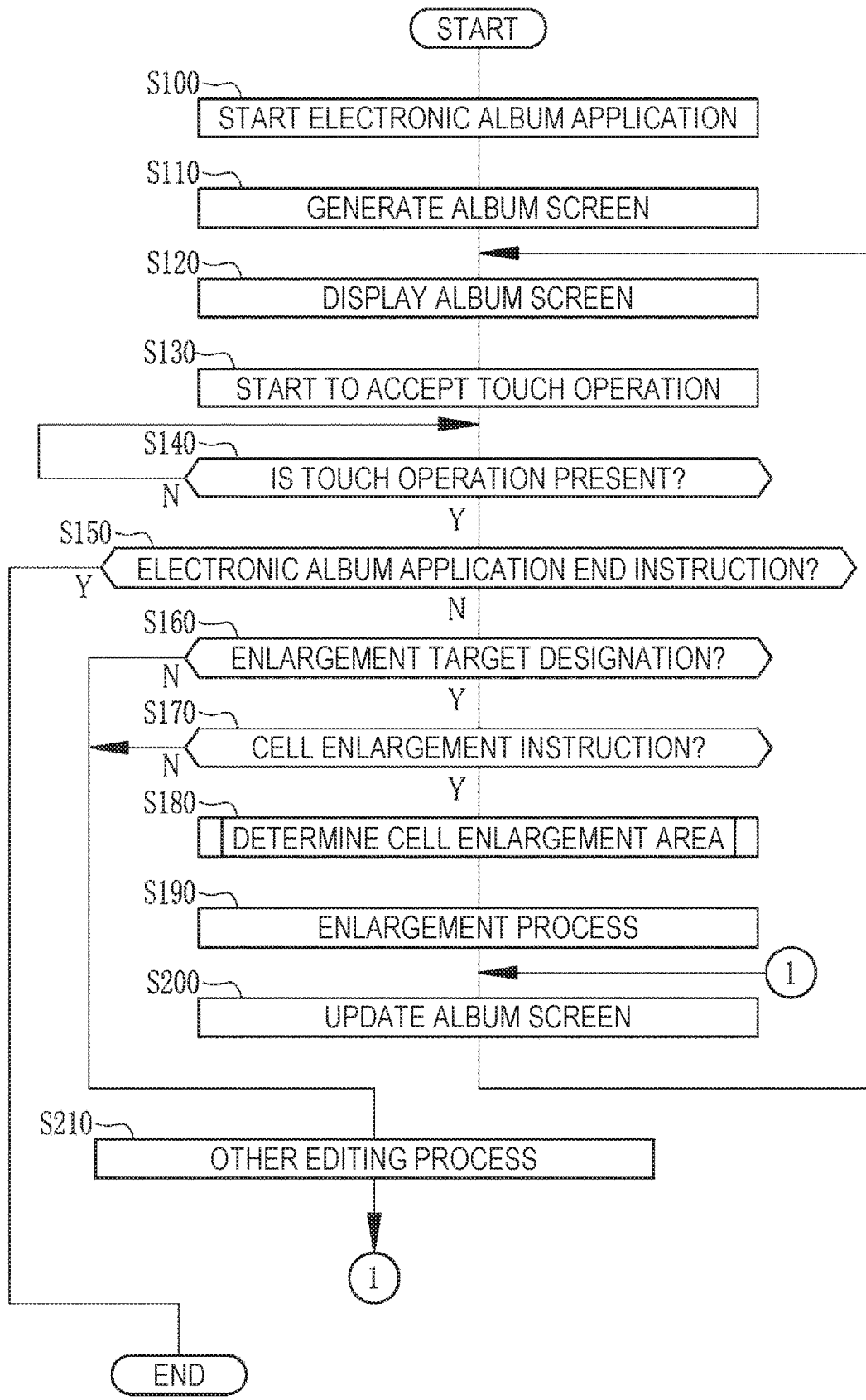
FIG. 18 is a flowchart illustrating operations.

Operations of the above configuration will be described with reference to the flowcharts in FIG. 18 and FIG. 19. In the mobile information terminal 10, when the electronic album application 30 is started (step S100), the album screen generating unit 34 starts to generate the album screen 14 (S110). In S110, the album screen generating unit 34 refers to the album management information 30A and reads out images P registered in the album management information 30A in the image storage unit 23A. Subsequently, the album screen generating unit 34 refers to the layout information in the album management information 30A, adjusts the size of the read-out images P, and arranges the images P in respective display cells CL within the album page 14A. Thus, the album screen generating unit 34 generates the album screen 14 illustrated in FIG. 1. The generated album screen 14 is displayed on the touch panel 12 (S120).

When the album screen 14 is displayed, the operation accepting unit 31 starts to accept a touch operation through the touch panel 12 (S130). The operation accepting unit 31 monitors input of a touch operation (S140). If a touch operation is input in S140 (Y in S140), the operation accepting unit 31 accepts the touch operation and determines content thereof. The operation accepting unit 31 determines whether the touch operation is an electronic album application end instruction (S150). If it is determined in S150 that the touch operation is an electronic album application end instruction (Y in S150), the electronic album application 30 ends.

On the other hand, if the touch operation is not an electronic album application end instruction in S150, the operation accepting unit 31 determines whether the touch operation is an operation for designating an enlargement target (S160). If the touch operation is a press-and-hold operation on the display cells CL32, the operation accepting unit 31 accepts the press-and-hold operation as an operation for designating the display cells CL32 as an enlargement target. Subsequently, on the basis of coordinate information of the position of the press-and-hold operation, the operation accepting unit 31 determines the designated display cell CL32 as an enlargement target (Y in S160). In a case of other operations, other editing processes are determined (N in S160). If other editing processes are determined, an album editing process (S210) is performed in accordance with the instruction content of the touch operation.

The operation accepting unit 31 determines whether a touch operation performed subsequently to the press-and-hold operation, which is an operation for designating an enlargement target, is a cell enlargement instruction for the display cell CL32 designated as an enlargement target (S170). If the touch operation is a swipe gesture from the display cell CL32 as a start point, the operation accepting unit 31 determines a cell enlargement instruction (Y in S170).

If a cell enlargement instruction is not determined in S170 (N in S170), and if, for example, a select/retract instruction, a temporary enlargement instruction, or the like of an image P is determined, the album editing process is performed in accordance with the instruction content (S210).

If it is determined in S170 that the operation instruction is a cell enlargement instruction (Y in S170), the cell enlargement area determining unit 33A in the enlargement processing unit 33 determines the enlargement size of the display cell CL. On the basis of the operation instruction, the cell enlargement area determining unit 33A determines an enlargement area of the display cell CL designated as an enlargement target (S180).

Figure 19:
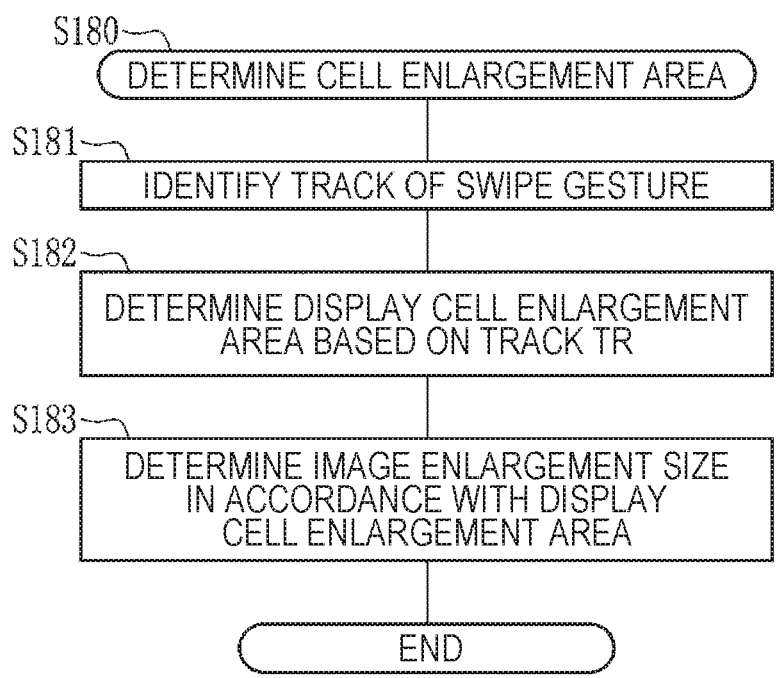
FIG. 19 is a flowchart of a cell enlargement area determining process.
Figure 23B:
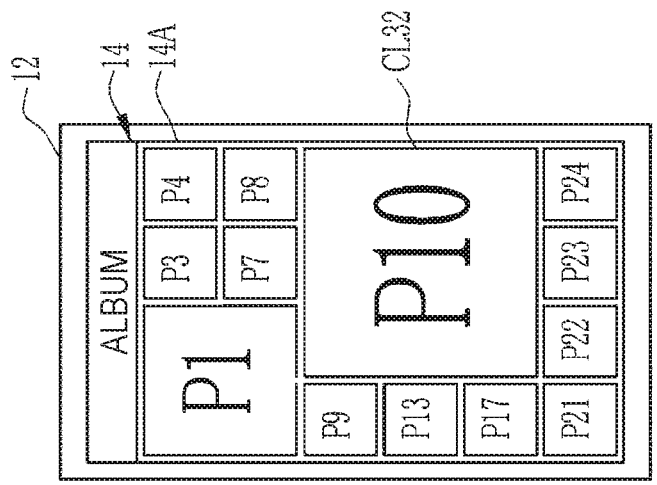
FIGS. 23A and 23B are schematic diagrams illustrating an operation in the process in FIGS. 22A and 22B.
Figure 23A:
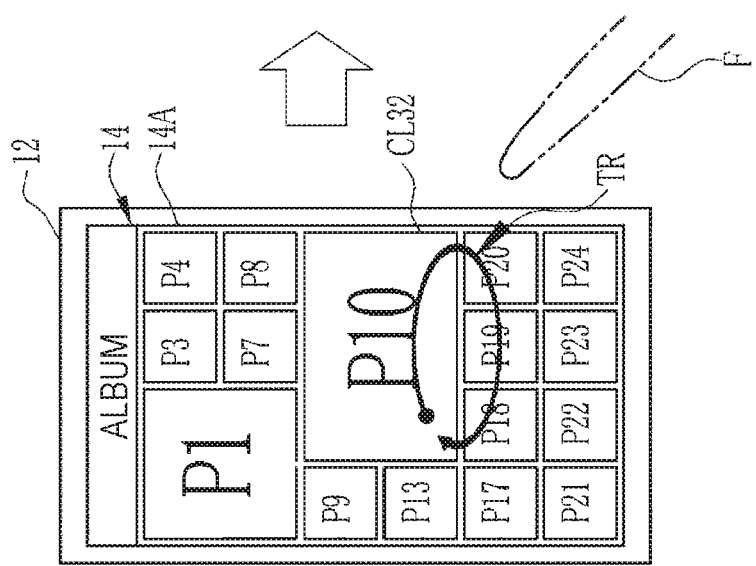

As illustrated in FIG. 19, in S180, on the basis of the operation instruction, the cell enlargement area determining unit 33A determines a track TR of the swipe gesture (S181). On the basis of the track TR, the enlargement area of the display cell CL is determined (S182). In this example, an area including display cells CL overlapping with the track TR is determined as the enlargement area.

In the determination of the enlargement area of the display cell CL, if the track TR is a horizontal straight line track TR as illustrated in FIG. 7A and FIG. 8B, the cell enlargement area determining unit 33A determines that the enlargement area is a horizontally oriented rectangle of one row and three columns. Similarly, if the track TR is a vertical straight line track TR as illustrated in FIG. 12A and FIG. 13A, the cell enlargement area determining unit 33A determines that the enlargement area is a vertically oriented rectangle of three rows and one column. In addition, if the track TR is an elliptic track TR as illustrated in FIG. 15A and FIG. 16A, the cell enlargement area determining unit 33A determines that the enlargement area is a rectangle of two rows and three columns.

On the basis of the determined enlargement area, as illustrated in FIG. 10, FIG. 14, and FIG. 17, the enlargement processing unit 33 determines the enlargement size of the image P (S183).

Referring back to FIG. 18, the enlargement processing unit 33 performs an enlargement process (S190). In S190, the enlargement processing unit 33 first enlarges the display cell CL in accordance with the determined enlargement area. Subsequently, the enlargement processing unit 33 enlarges the image P in accordance with the determined enlargement size. Lastly, as illustrated in FIG. 10, FIG. 14, and FIG. 17, the enlargement processing unit 33 trims part of the image P in accordance with the size and the shape of the enlarged display cell CL and arranges the trimmed part of the image P in the enlarged display cell CL. The album screen generating unit 34 updates the album screen 14 to a screen on which the album page 14A with the enlarged display cell CL and image P is displayed (S200).

In the above manner, in the mobile information terminal 10 functioning as an electronic album apparatus, images P in the respective frames are arranged in display cells CL. The size of the display cell CL is changed to be N times as large as the reference size in units of the reference size. In accordance with the track TR of the gesture with the finger F, the cell enlargement area determining unit 33A determines the number of boxes in units of the reference size as the size after enlargement and also determines the shape of the enlargement area after enlargement. Since the display cell CL is enlarged to be N times as large as the reference size on the basis of this determination, even if an instruction for enlarging the image P is issued by a gesture of the finger F, the block lines BL are not misaligned. Thus, alignment of the plurality of display cells CL arranged in a grid form is not disturbed, and a well-organized arrangement state of the images P on the album screen 14 can be maintained. As a result, on the album screen 14, the plurality of images P can be arranged in a good-looking manner with ease.

In addition, the gesture for issuing the enlargement instruction in the example is a swipe gesture for tracking the album screen 14 with one finger from an enlargement-target display cell CL as a start point. Thus, the enlargement instruction can be issued with the one finger F. Such a swipe gesture is particularly useful in a case where the screen size of the touch panel 12 is small, such as when the mobile information terminal 10 is a smartphone.

In addition, the cell enlargement area determining unit 33A determines that the area including a plurality of display cells CL overlapping with the track TR of the finger F in the swipe gesture is the enlargement area. Since such a swipe gesture is an intuitive operation, it is easy to designate the size as intended by the user 13.

In addition, in the above example, after the display cell CL has been enlarged on the album page 14A, images P in display cells CL that have been present before enlargement within the enlargement area occupied by the display cell CL after enlargement are retracted to the retract page 14B. Thus, for example, if some photographs of the same scene are taken in succession, some similar images P may be arranged in succession on the album page 14A. In such a case, since an image P in one frame in an enlargement target can be left and other adjacent images P can be deleted from the album page 14A, images within the electronic album can be organized with ease.

In addition, as illustrated in FIGS. 7A and 7B, FIGS. 8A to 8C, FIGS. 12A and 12B, FIGS. 13A and 13B, FIGS. 15A and 15B, and FIGS. 16A and 16B, in the size of the display cell CL, the size that is N times as large as the reference size includes, in units of the reference size for rows or columns, at least one of one row×a plurality of columns, a plurality of rows×one column, or a plurality of rows×a plurality of columns. Thus, the shape of the display cell CL can be made appropriate in accordance with the shape of the image P, and for example, when there is a panorama image P, this image P is displayed as a horizontally long shape.

In addition, in the above example, as illustrated in FIG. 10, FIG. 14, and FIG. 17, the image P is trimmed, and thereby the image P is partly displayed in accordance with the aspect ratio of the display cell CL. Thus, even if the aspect ratio differs between the image P and the display cell CL, the image P can be displayed without generating a margin within the display cell CL. As a result, the image P can be displayed as large as possible in accordance with the size of the display cell CL.

In addition, in the above example, as illustrated in FIGS. 11A and 11B, the display part of the image P partly displayed in the display cell CL is changeable. Thus, only a part that is wished to be displayed within the image P can be displayed in the display cell CL.

Modification Example 1-1

As illustrated in FIGS. 20A and 20B and FIGS. 21A and 21B, a plurality of display cells CL within the album page 14A can also be enlarged. In the example in FIGS. 20A and 20B and FIGS. 21A and 21B, in addition to a display cell CL32, a display cell CL11 is enlarged. In this example, the display cell CL11 is enlarged from the reference size of one row and one column to the display cell CL11 of two rows and two columns. In response to enlargement of the display cell CL11, an image P1 is enlarged. In addition, display cells CL12, CL21, and CL22 overlapping with the enlarged display cell CL11 are deleted. Furthermore, images P2, P5, and P6 arranged in these are retracted to the retract page 14B.

In addition, as illustrated in FIGS. 22A and 22B and FIGS. 23A and 23B, a display cell CL that is enlarged once may be enlarged again. In the example in FIGS. 22A and 22B and FIGS. 23A and 23B, the display cell CL32 that is once enlarged to a size of two rows and three columns is further enlarged to a size of three rows and three columns. The gist of designating an enlargement area by a swipe gesture of a finger F is the same as that in the above example.

In addition, as illustrated in FIGS. 24A and 24B, the designation of the enlargement area may be hollow designation in such a manner that only display cells arranged in the outer periphery of display cells CL at the center are designated, excluding the display cells CL at the center. For example, in the example in FIG. 24A, there are four boxes of display cells CL in which images P10, P11, P14, and P15 are arranged at the center. Excluding these four boxes of display cells CL, twelve boxes of display cells CL in the periphery of the four boxes of display cells CL, in which images P5, P6, P7 . . . are arranged, are designated as the enlargement area by a track TR. In this case, as illustrated in FIG. 24B, the image P5 in the enlargement target located at the start point of the track TR is enlarged to a size of twelve boxes overlapping with the track TR. Note that the four boxes of display cells CL that are arranged inside the track TR and do not overlap with the track TR are not included in the enlargement area. Thus, the image P5 is displayed in a hollow state. In this manner, the shape of the enlargement area may be other than a square or a rectangle.

Modification Example 1-2

Figure 25B:
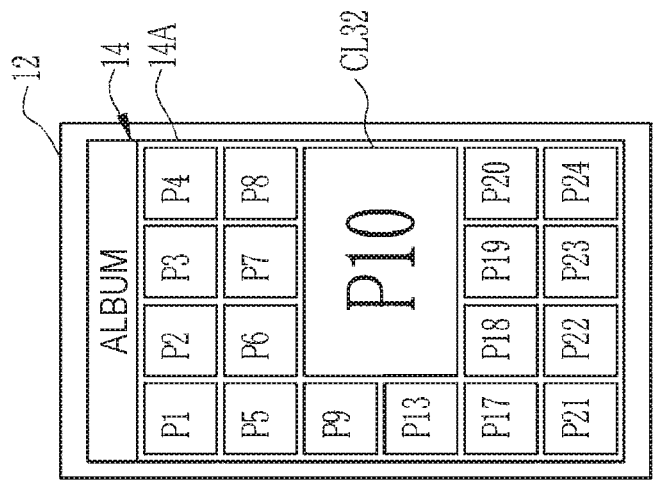
FIGS. 25A and 25B are explanatory diagrams of an example for displaying an enlargement area in a distinguishable manner.
Figure 25A:
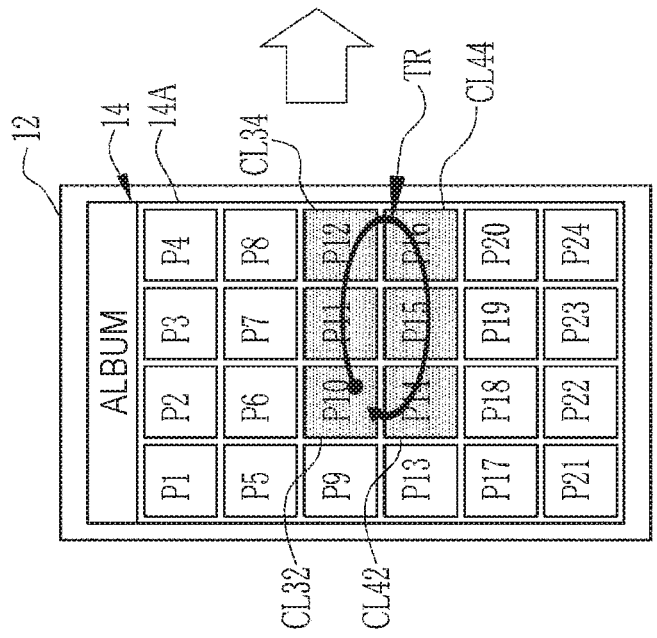

In addition, as illustrated in FIGS. 25A and 25B, while a swipe gesture is being performed for a cell enlargement instruction, an enlargement area overlapping with a track TR of a finger F is displayed in a form distinguishable from other areas that do not overlap with the track TR of the finger F. As illustrated in FIG. 25A, while a swipe gesture is being performed, the album screen generating unit 34 displays an enlargement area of six boxes, which are display cells CL32 to CL34 and display cells CL42 to CL44 overlapping with the track TR of the finger F in a form distinguishable from other areas, such as being grayed out as indicated by hatching.

Thus, even during the swipe gesture, a user 13 can intuitively understand the range of the enlargement area overlapping with the track TR. This makes it easy to precisely designate a final enlargement area, such as a display cell CL32 illustrated in FIG. 25B, desired by the user 13.

Modification Example 1-3

In addition, as illustrated in FIGS. 26A and 26B, while a swipe gesture is being performed, an enlargement-target display cell CL located at a start point S of a track TR may be displayed in a form distinguishable from the other display cells CL. In the example illustrated in FIG. 26A, a display cell CL32 in which an image P10 is arranged is designated as an enlargement target and is the start point S of the track TR. As illustrated in FIG. 26B, the track TR of the swipe gesture proceeds, from the display cell CL32 at which the start point S is located, to display cells CL in which images P11, P12, and P16 are arranged.

At this time, the album screen generating unit 34 displays the display cell CL32, at which the start point S is located, in an emphasized manner in a form distinguishable from the display cells CL in which the images P11, P12, and P16 are arranged. The form of emphasized display of the display cell CL32 may be a form in which, for example, the outer periphery of the display cell CL32 is displayed by a thick frame as illustrated in FIG. 26B. By displaying the enlargement-target display cell CL in an emphasized manner, the enlargement-target display cell CL and the image P are not missing even during the swipe gesture.

Figures 27A, 27B, 27C:
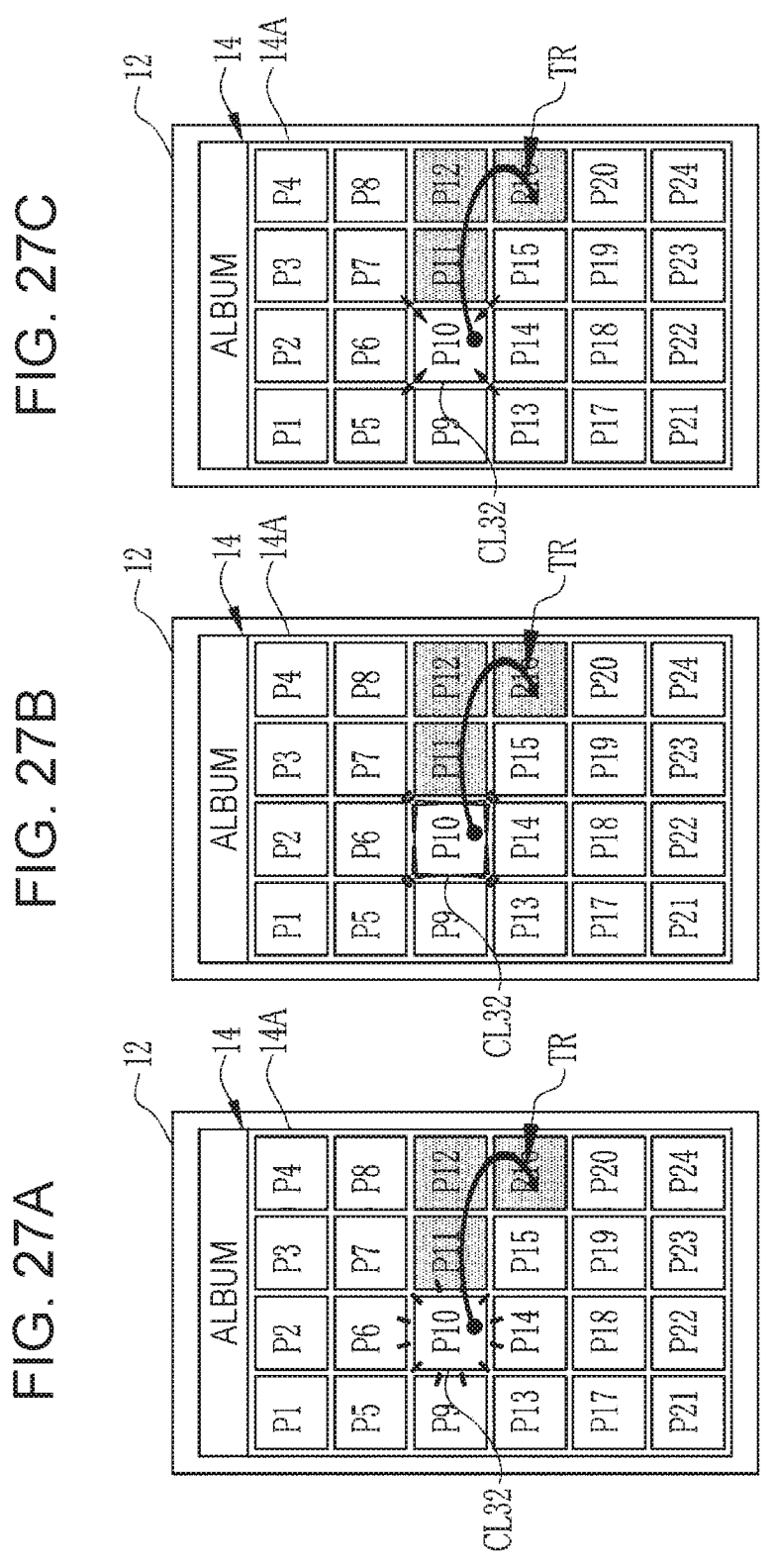

In addition, as illustrated in FIGS. 27A to 27C, various forms may be considered as the form of emphasized display of the enlargement-target display cell CL. For example, the enlargement-target display cell CL32 may blink as illustrated in FIG. 27A, the enlargement-target display cell CL32 may vibrate as illustrated in FIG. 27B, and the enlargement-target display cell CL32 may expand and contract as illustrated in FIG. 27C. Any of these forms may be employed as the form of emphasized display.

Note that in the example illustrated in FIGS. 26A and 26B and FIGS. 27A to 27C, the other display cells CL other than the enlargement-target display cell among the display cells CL within the enlargement area overlapping with the track TR are displayed in a form distinguishable from the other cells other than the enlargement area by being grayed out as in the example illustrated in FIG. 25A.

Figure 28B:
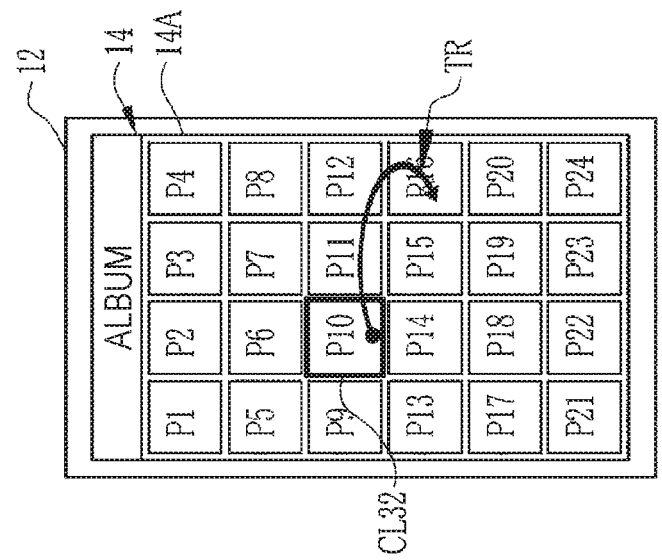
FIGS. 28A and 28B are explanatory diagrams according to a modification example for displaying an enlargement area in a distinguishable manner.
Figure 28A:
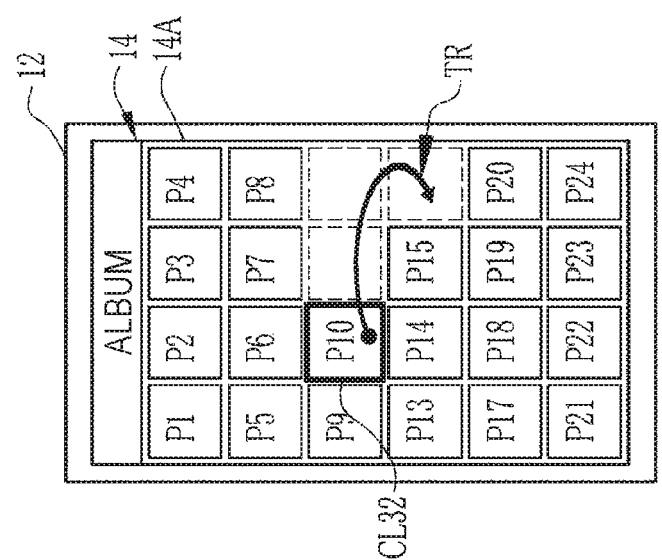

The form to display the other display cells CL to be distinguishable, the display cells CL being other than the enlargement-target display cell among display cells CL within the enlargement area overlapping with the track TR may be the form illustrated in FIGS. 28A and 28B. As illustrated in FIG. 28A, the outer periphery of the enlargement-target display cell CL32 is displayed by a thick frame. In addition, by decreasing transparency, the display cells CL other than the enlargement target within the enlargement area are distinguishable. In addition, FIG. 28B is the same as FIG. 28A in that the enlargement target is displayed by a thick frame. The different point is to display the track TR itself so that the enlargement area can be distinguishable. In this manner, a user 13 can also intuitively understand the range of the enlargement area.

Second Embodiment

A second embodiment illustrated in FIGS. 29A to 29C and FIGS. 30A to 30C is different from the first embodiment in a method for designating an enlargement area. The other points are the same as in the first embodiment, and different points will be mainly described. As illustrated in FIG. 29A, an enlargement-target display cell CL (a display cell CL32 in the example) is designated. The method for designating the enlargement-target display cell CL is a touch operation of the display cell CL32 with a finger F. The method for designating the enlargement area is performed by a swipe gesture illustrated in FIG. 29B without releasing the finger F that is touched in FIG. 29A from the enlargement-target display cell CL32. The swipe gesture illustrated in FIG. 29B is an operation for extending one end of the enlargement-target display cell CL32 with the finger F in an enlarging direction. As illustrated in FIG. 29B, while the swipe gesture is being performed, the enlargement-target display cell CL32 and an image P10 arranged therein are displayed in a state of being extended along a track TR of movement of the finger F.

In the second embodiment, the cell enlargement area determining unit 33A determines the enlargement area on the basis of positions of a start point S and an end point E of the track TR of the finger F. In the example in FIGS. 29A to 29C, the track TR is a horizontally extending straight line, and three boxes of display cells CL are present from the start point S to the end point E of the track TR. On the basis of such a track TR, the cell enlargement area determining unit 33A determines that the enlargement area is one row and three columns. As illustrated in FIG. 29C, the display cell CL32 and the image P10 arranged therein are enlarged to the determined size of the enlargement area of one row and three columns.

Figures 30A, 30B, 30C:
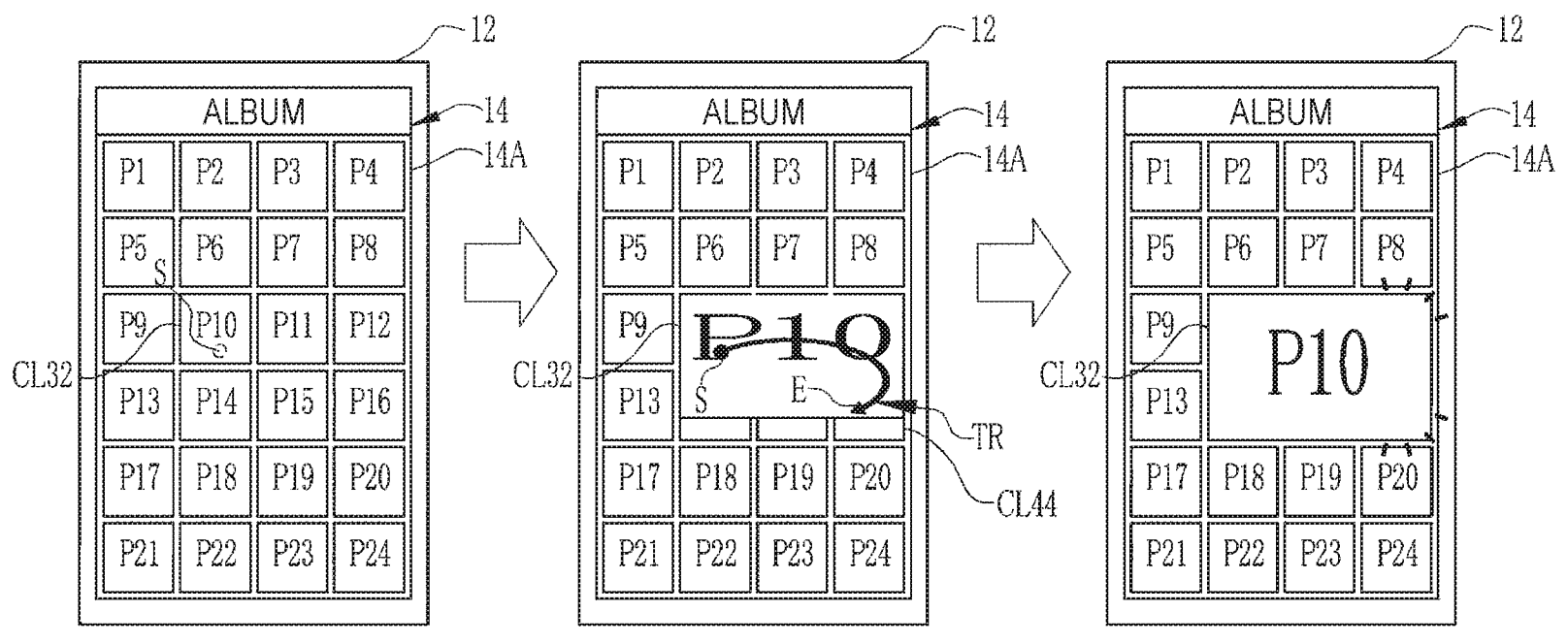

In the example illustrated in FIGS. 30A to 30C, a display cell CL32 of the reference size of one row and one column is enlarged to a size of an enlargement area of two rows and three columns. As illustrated in FIG. 30A, the display cell CL32 is touched by a finger F and designated as an enlargement target. For this enlargement target, as illustrated in FIG. 30B, a swipe gesture is performed to extend one end of the enlargement target while keeping the touch state from a touched start point S with the one finger F.

A track TR of the swipe gesture illustrated in FIG. 30B once proceeds rightward to pass through display cells CL33 and CL34 and then changes the track downward to draw a circular arc from the start point S. An end point E of the track TR reaches a display cell CL44. The track TR proceeds three boxes in the horizontal direction and proceeds two boxes in the vertical direction. On the basis of the start point S and the end point E of such a track TR, the cell enlargement area determining unit 33A determines that the enlargement area of the display cell CL32 is six boxes of two rows and three columns. As illustrated in FIG. 30C, the enlargement processing unit 33 enlarges the enlargement-target display cell CL32 and the image P10 to the determined size of the enlargement area.

Also in a case where the enlargement area is designated by an operation for extending one end of the enlargement target as a swipe gesture as in the second embodiment, an enlargement instruction is issued by the one finger F as in the first embodiment. Thus, even if the screen size of the touch panel 12 is small, the enlargement instruction is easily issued. In addition, the operation is intuitive also in the second embodiment, and thus, as in the first embodiment, the enlargement area can be designated as intended by a user 13 with ease. Furthermore, while the swipe gesture is being performed, the image P10 in the enlargement target is displayed in a state of being extended along the track TR of the finger F. Thus, the user 13 can easily recognize the enlargement-target image P also during the swipe gesture.

Modification Example 2-1

FIGS. 31A and 31B illustrate an example of performing a swipe gesture of a track TR that is the same as that in FIGS. 24A and 24B in the first embodiment. In the second embodiment, an enlargement area is determined on the basis of a start point S and an end point E of the track TR. In FIGS. 24A and 24B in the first embodiment, four boxes of display cells CL at the center, which do not overlap with the track TR, are excluded from the enlargement area, and it is determined that the form of the enlargement area is hollow.

In contrast, in the second embodiment, since the enlargement area is determined on the basis of the start point S and the end point E, even if a part that does not overlap with the track TR is present, the part can be determined as the enlargement area. In the example in FIG. 31A, the cell enlargement area determining unit 33A determines four boxes of display cells CL at the center surrounded by the track TR as the enlargement area. Thus, as illustrated in FIG. 31B, the enlargement area of a display cell CL21 of the reference size of one row and one column before enlargement is determined as an area of a square of four rows and four columns, obtained by adding four boxes at the center to twelve boxes overlapping with the track TR.

Modification Example 2-2

Although the second embodiment has described a swipe gesture using one finger F as an example of a gesture for designating an enlargement area, for example, pinch-out for moving two fingers F apart on an enlargement-target display cell CL may be performed. It is needless to say that a gesture with one finger F is preferable if the screen of the touch panel 12 is small.

Each of the above embodiments has described an example in which, after the display cell CL has been enlarged, images P in display cells CL that have been present before enlargement within the enlargement area occupied by the display cell CL after enlargement are retracted to the retract page 14B.

Figure 32B:
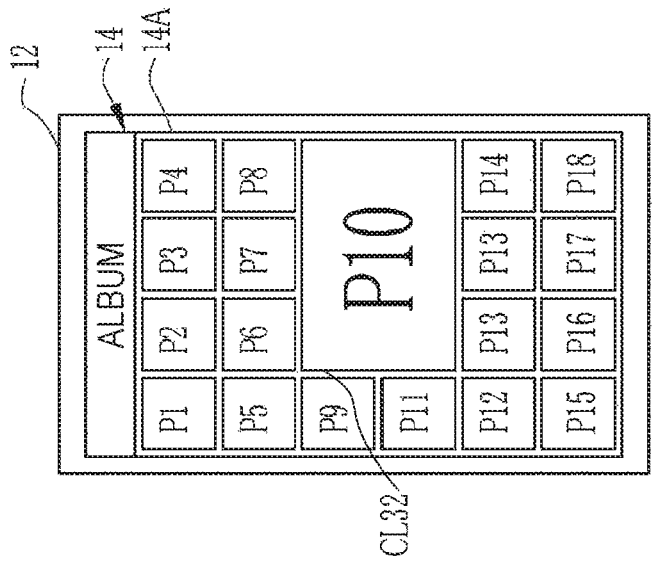
FIGS. 32A and 32B are explanatory diagrams for rearranging images in accordance with cell enlargement.
Figure 32A:
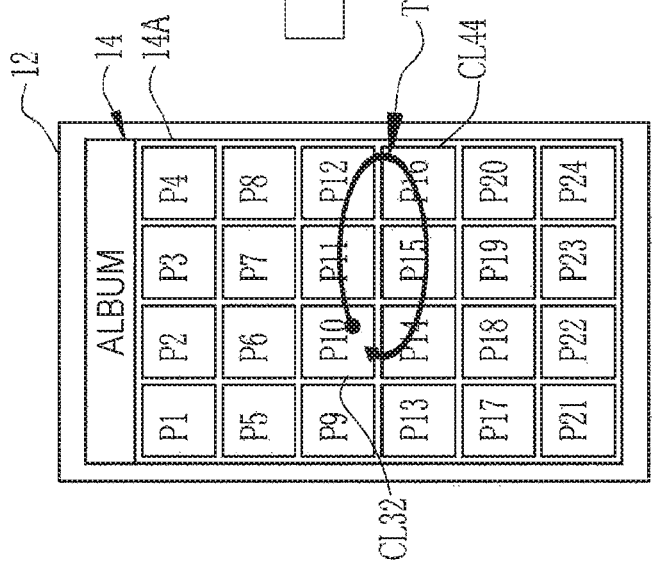

However, as illustrated in FIG. 32, after the display cell CL has been enlarged, images P in display cells CL that have been present before enlargement within the enlargement area occupied by the display cell CL after enlargement may be rearranged in display cells CL that do not overlap with the enlargement area. In the example in FIG. 32, as illustrated in FIG. 32A, for a display cell CL32 of the reference size of one row and one column, an enlargement area of two rows and three columns is designated by an elliptic track TR from the display cell CL32 as a start point S.

In this case, within the enlargement area of two rows and three columns occupied by the display cell CL32 after enlargement, six boxes of display cells CL32, CL33, CL34, CL42, CL43, and CL44 have been present before enlargement. Images P11, P12, P14, P15, and P16 arranged in five boxes among them excluding the enlargement-target display cell CL32 are rearranged in display cells CL that do not overlap with the enlargement area after enlargement of the enlargement-target display cell CL32 as illustrated in FIG. 32B. That is, the images P11, P12, P14, P15, and P16 are not retracted to the retract page 14B but remain on the album page 14A.

Although the above embodiments have described an example in which the shape of the reference size of the display cell CL is a square, the shape is not limited to a square and may be a rectangle. As the rectangle, for example, a rectangle with an aspect ratio of 3 (height)×4 (width) or 9 (height)×16 (width), or the like is considered. With such an aspect ratio that is typically used for photographs, trimming is unnecessary when a photograph image is arranged in a display cell CL.

In addition, in the initial state, all display cells CL do not necessarily have the same size, and for example, a display cell CL in which a specific image is arranged may have a larger size than display cells CL in which other images are arranged. As a method for determining the specific image, for example, automatic determination may be performed on the basis of content (such as date or photographing location information) of exchangeable image file format (EXIF) data attached to image data.

In addition, by using a technique for evaluating an image through image analysis, an image with a high evaluation value may be determined as a specific image. The method for evaluating an image through image analysis may be, for example, a method using an image evaluation technique described in JP5655112B to apply high evaluation to a human image and a sharp focus image. An image to which high evaluation is applied by using such an image evaluation technique is determined as the specific image.

The size of a display cell CL in which the specific image is arranged in the initial state is, for example, a size of two rows and two columns of the reference size. With this size, the specific image can be more outstanding than the other images.

In the above embodiments, the mobile information terminal 10 may be, in addition to a smartphone, a tablet computer or a laptop computer.

Furthermore, although an example in which the image storage unit is provided in the storage device 23 of the mobile information terminal 10 has been described, the image storage unit may be arranged in an image server existing on a network such as the Internet. In this case, the mobile information terminal 10 accesses the image server via the network and reads out images P.

Figure 33:
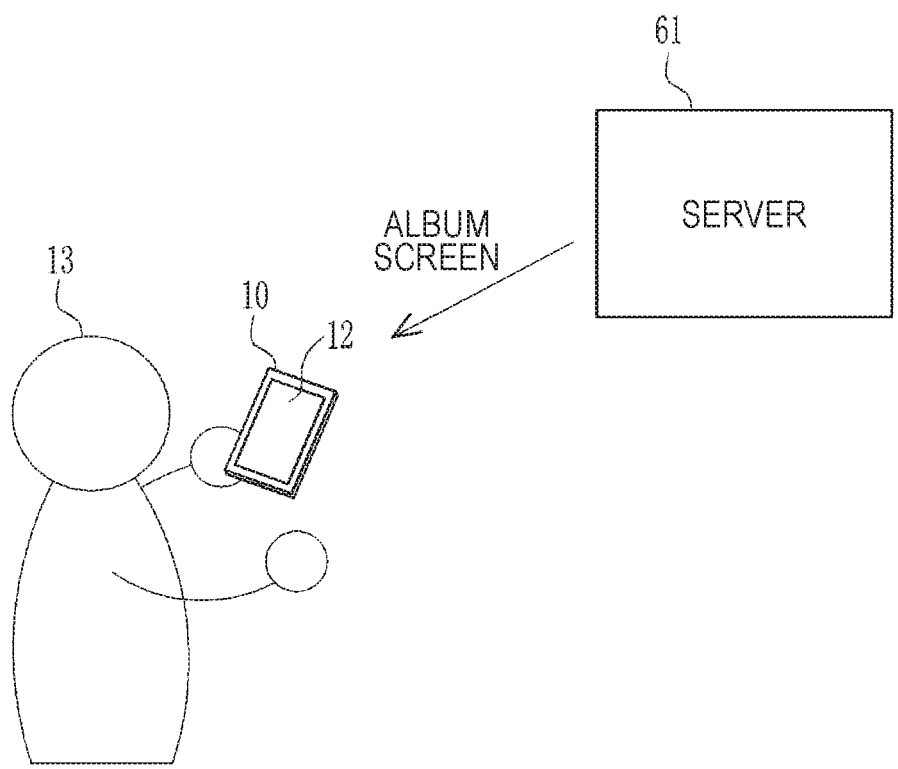
FIG. 33 is an explanatory diagram of a form using a data processing server.

In addition, although the above embodiments have described an example in which the mobile information terminal 10 functions as an electronic album apparatus, a data processing server 61 illustrated in FIG. 33 may function as an electronic album apparatus. The data processing server 61 is a computer, and its fundamental configuration is the same as that in FIG. 2. It is needless to say that the processing ability of the CPU is much higher than that of the mobile information terminal 10, and also the capacity of the work memory and the storage device is much larger.

By the CPU of the data processing server 61 executing the electronic album application 30, the operation accepting unit 31, the album editing unit 32, the enlargement processing unit 33, the cell enlargement area determining unit 33A, and the album screen generating unit 34 are implemented. A browser is installed in the mobile information terminal 10. The mobile information terminal 10 accesses the data processing server 61 through the browser and thus downloads the album screen 14 from the data processing server 61. The downloaded album screen 14 is displayed on the touch panel 12.

Upon a touch operation being performed through the touch panel 12, the mobile information terminal 10 transmits the operation instruction to the data processing server 61. On the basis of the received operation instruction, the data processing server 61 performs an album editing process and updates the album screen 14, and delivers the updated album screen 14 to the mobile information terminal 10. The data processing server 61 can function as an electronic album apparatus in this manner.

In addition, components may be dispersed in the mobile information terminal 10 and the data processing server 61 by providing the operation accepting unit 31 and the album screen generating unit 34 in the mobile information terminal 10 and the rest of the components in the data processing server 61. In this case, a computer system composed of the mobile information terminal 10 and the data processing server 61 functions as an electronic album apparatus.

In the above embodiments, in terms of hardware configuration, for example, processing units that perform various processes such as the operation accepting unit 31, the album editing unit 32, the enlargement processing unit 33, the cell enlargement area determining unit 33A, and the album screen generating unit 34 are various processors as follows.

Various processors include a central processing unit (CPU), a programmable logic device (PLD), a dedicated electric circuit, and the like. The CPU is, as is well known, a general-purpose processor functioning as various processing units by executing software (operation program). The PLD is a processor in which the circuit configuration is changeable after manufacture, such as field programmable gate array (FPGA). The dedicated electric circuit is a processor having a circuit configuration that is specially designed to execute specific processing, such as an application specific integrated circuit (ASIC).

One processing unit may be constituted by one of these various processors, or may be constituted by two or more processors of the same type or different types in combination (e.g., a combination of a plurality of FPGAs or a combination of a CPU and an FPGA). In addition, a plurality of processing units may be constituted by one processor. As a first example for constituting a plurality of processing units with one processor, one processor may be constituted by a combination of one or more CPUs and software, and this processor may function as a plurality of processing units. As a second example, a processor may be used that implements the functions of the entire system including a plurality of processing units with one integrated circuit (IC) chip as typified by a system on chip (SoC) or the like. In this manner, various processing units are constituted by one or more of the above various processors in terms of hardware configuration.

Furthermore, the hardware configuration of these various processors is, more specifically, electric circuitry obtained by combining circuit elements such as semiconductor elements.

From the above description, an electronic album apparatus described in the following supplementary note can be obtained.

Supplementary Note 1

An electronic album apparatus including:

an album screen generating processor that generates an electronic album screen on which a plurality of image display cells are arranged in a grid form to display a plurality of images, the plurality of image display cells each being an image display cell in which an image in one frame is arranged and a size of which is changed to be N times as large as a reference size in units of the reference size;

an operation accepting processor that accepts, through a gesture for tracking the electronic album screen with a finger, the gesture being an operation for designating one of the image display cells and issuing an instruction for enlarging the size of the designated image display cell, a cell enlargement instruction for enlarging the image display cell;

a cell enlargement area determining processor that determines a number of boxes in units of the reference size as the size of the image display cell, which is designated as an enlargement target, after enlargement in accordance with a track of the finger in the gesture within the electronic album screen, and determines a shape of an enlargement area after enlargement; and an enlargement processing processor that enlarges the image display cell that is the enlargement target and the image in accordance with the determined enlargement area, wherein N is a natural number of greater than or equal to 1.

The present invention is not limited to the above-described embodiments, and various configurations can be employed without departing from the spirit of the present invention, as a matter of course. In addition, the above-described various embodiments and various modifications may be combined as appropriate. Furthermore, the present invention covers not only the program but also a recording medium having the program stored therein.

REFERENCE SIGNS LIST 10 mobile information terminal
12 touch panel display (touch panel)
12A display unit
12B operation input unit
13 user
14 album screen
14A album page
14B retract image accommodating page (retract page)
14C edit menu
14D trimming position adjustment screen
21 central processing unit (CPU)
22 work memory
23 storage device
23A image storage unit
27 data bus
28 network
29 application program
30 electronic album application
30A album management information
31 operation accepting unit
32 album editing unit
33 enlargement processing unit
33A cell enlargement area determining unit
34 album screen generating unit
61 data processing server
BL block line
CL, SCL display cell
E end point
F finger
P image
S start point
TR track

What is claimed is:

1. An electronic album apparatus comprising:
a processor configured to:
generate an electronic album screen on which a plurality of image display cells are arranged in a grid form to display a plurality of images, the plurality of image display cells each being an image display cell in which an image in one frame is arranged and a size of which is changed to be N times as large as a reference size in units of the reference size;
accept a touch operation including a gesture of tracking the electronic album screen with a finger;
determine one of the image display cells as an enlargement target on the basis of the touch operation;
determine a number of boxes in units of the reference size as the size of the image display cell, which is determined as the enlargement target, after enlargement in accordance with a track of the finger in the gesture within the electronic album screen, and determine a shape of an enlargement area after enlargement; and
enlarge the image display cell that is the enlargement target and the image in accordance with the determined enlargement area,
wherein N is a natural number of greater than or equal to 2,
the gesture is a swipe gesture of tracking the electronic album screen with the finger from, as a start point, the image display cell that is the enlargement target on the electronic album screen,
the processor determines that an area including a plurality of image display cells among the plurality of image display cells overlapping with a track of the finger in the swipe gesture is the enlargement area,
the track of the finger in the swipe gesture includes image display cells in a plurality of rows of the grid form or a plurality of columns of the grid form,
the electronic album screen includes an album page and a retract image accommodating page, the album page being a page on which an image selected by a user as an image to be displayed from among the plurality of images is arranged, the retract image accommodating page being a page in which an image retracted from the album page is accommodated, and being capable of performing an operation for designating an image and moving the designated image from one of the album page or the retract image accommodating page to an other of the album page or the retract image accommodating page by the touch operation including a gesture of tracking the electronic album screen with the finger, and
on the album page after the image display cell has been enlarged, images in the image display cells that have been present before enlargement within the enlargement area occupied by the image display cell after enlargement, other than the image being enlarged, are retracted to the retract image accommodating page.

2. The electronic album apparatus according to claim 1, wherein the enlargement area overlapping with the track of the finger is displayed in a form distinguishable from other areas that do not overlap with the track of the finger while the swipe gesture is being performed.

3. The electronic album apparatus according to claim 2, wherein the image display cell that is the enlargement target, which is the start point of the track of the finger in the swipe gesture, is displayed in a form distinguishable from the other image display cells while the swipe gesture is being performed.

4. The electronic album apparatus according to claim 1, wherein the processor accepts, after accepting designation of the enlargement target, an operation for extending one end of the enlargement target with the finger as the swipe gesture and determines the enlargement area on the basis of the start point and an end point of the track of the finger in the swipe gesture.

5. The electronic album apparatus according to claim 4, wherein the image in the enlargement target is displayed in a state of being extended along the track of the finger while the swipe gesture is being performed.

6. The electronic album apparatus according to claim 5, wherein the image display cell that is the enlargement target, which is the start point of the track of the finger in the swipe gesture, is displayed in a form distinguishable from the other image display cells while the swipe gesture is being performed.

7. The electronic album apparatus according to claim 4, wherein the image display cell that is the enlargement target, which is the start point of the track of the finger in the swipe gesture, is displayed in a form distinguishable from the other image display cells while the swipe gesture is being performed.

8. The electronic album apparatus according to claim 1, wherein the image display cell that is the enlargement target, which is the start point of the track of the finger in the swipe gesture, is displayed in a form distinguishable from the other image display cells while the swipe gesture is being performed.

9. The electronic album apparatus according to claim 1, wherein, after the image display cell has been enlarged, images in the image display cells that have been present before enlargement within the enlargement area occupied by the image display cell after enlargement are rearranged in the image display cells that do not overlap with the enlargement area.

10. The electronic album apparatus according to claim 1, wherein, in the size of the image display cell, the size that is N times as large as the reference size includes, in units of the reference size for rows or columns, at least one of one row x a plurality of columns, a plurality of rows x one column, or a plurality of rows x a plurality of columns.

11. The electronic album apparatus according to claim 10, wherein, if an aspect ratio of the image and an aspect ratio of the image display cell differ from each other, the image is partly displayed in accordance with the aspect ratio of the image display cell.

12. The electronic album apparatus according to claim 11, wherein the display part of the image partly displayed in the image display cell is changeable.

13. The electronic album apparatus according to claim 1, wherein the electronic album screen is displayed on a touch panel display of a mobile information terminal.

14. A method for operating an electronic album apparatus, the method comprising:
generating an electronic album screen on which a plurality of image display cells are arranged in a grid form to display a plurality of images, the plurality of image display cells each being an image display cell in which an image in one frame is arranged and a size of which is changed to be N times as large as a reference size in units of the reference size;
accepting a touch operation including a gesture of tracking the electronic album screen with a finger;
determining one of the image display cells as an enlargement target on the basis of the touch operation;
determining a number of boxes in units of the reference size as the size of the image display cell, which is determined as the enlargement target, after enlargement in accordance with a track of the finger in the gesture within the electronic album screen, and determining a shape of an enlargement area after enlargement; and
enlarging the image display cell that is the enlargement target and the image in accordance with the determined enlargement area,
wherein N is a natural number of greater than or equal to 2,
the gesture is a swipe gesture of tracking the electronic album screen with the finger from, as a start point, the image display cell that is the enlargement target on the electronic album screen,
the method further comprises determining that an area including a plurality of image display cells among the plurality of image display cells overlapping with a track of the finger in the swipe gesture is the enlargement area,
the track of the finger in the swipe gesture includes image display cells in a plurality of rows of the grid form or a plurality of columns of the grid form,
the electronic album screen includes an album page and a retract image accommodating page, the album page being a page on which an image selected by a user as an image to be displayed from among the plurality of images is arranged, the retract image accommodating page being a page in which an image retracted from the album page is accommodated, and being capable of performing an operation for designating an image and moving the designated image from one of the album page or the retract image accommodating page to an other of the album page or the retract image accommodating page by the touch operation including a gesture of tracking the electronic album screen with the finger, and
on the album page after the image display cell has been enlarged, images in the image display cells that have been present before enlargement within the enlargement area occupied by the image display cell after enlargement, other than the image being enlarged, are retracted to the retract image accommodating page.

15. A non-transitory computer readable recording medium storing an electronic album operation program for causing a computer to function as an electronic album apparatus, the electronic album operation program comprising:
generating an electronic album screen on which a plurality of image display cells are arranged in a grid form to display a plurality of images, the plurality of image display cells each being an image display cell in which an image in one frame is arranged and a size of which is changed to be N times as large as a reference size in units of the reference size;
accepting a touch operation including a gesture of tracking the electronic album screen with a finger;
determining one of the image display cells as an enlargement target on the basis of the touch operation;
determining a number of boxes in units of the reference size as the size of the image display cell, which is determined as the enlargement target, after enlargement in accordance with a track of the finger in the gesture within the electronic album screen, and determining a shape of an enlargement area after enlargement; and
enlarging the image display cell that is the enlargement target and the image in accordance with the determined enlargement area,
wherein N is a natural number of greater than or equal to 1,
the gesture is a swipe gesture of tracking the electronic album screen with the finger from, as a start point, the image display cell that is the enlargement target on the electronic album screen,
the electronic album operation program further comprises determining that an area including a plurality of image display cells among the plurality of image display cells overlapping with a track of the finger in the swipe gesture is the enlargement area,
the track of the finger in the swipe gesture includes image display cells in a plurality of rows of the grid form or a plurality of columns of the grid form,
the electronic album screen includes an album page and a retract image accommodating page, the album page being a page on which an image selected by a user as an image to be displayed from among the plurality of images is arranged, the retract image accommodating page being a page in which an image retracted from the album page is accommodated, and being capable of performing an operation for designating an image and moving the designated image from one of the album page or the retract image accommodating page to an other of the album page or the retract image accommodating page by the touch operation including a gesture of tracking the electronic album screen with the finger, and
on the album page after the image display cell has been enlarged, images in the image display cells that have been present before enlargement within the enlargement area occupied by the image display cell after enlargement, other than the image being enlarged, are retracted to the retract image accommodating page.

* * * * *